(12) United States Patent
Liu et al.

(10) Patent No.: US 12,704,691 B2
(45) Date of Patent: Aug. 11, 2026

(54) WAVELENGTH-DETECTING OPTICAL FIBER IDENTIFIER APPARATUS AND METHOD

(71) Applicant: AFL Telecommunications LLC, Duncan, SC (US)

(72) Inventors: Bin Liu, Chestnut Hill, MA (US); Dale Eddy, Gilford, NH (US); Magdy Sadek, Nashua, NH (US); Scott Prescott, Belmont, NH (US); Dan Farley, Westminister, MA (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 18/293,561

(22) PCT Filed: Jun. 23, 2022

(86) PCT No.: PCT/US2022/034699
§ 371 (c)(1),
(2) Date: Jan. 30, 2024

(87) PCT Pub. No.: WO2023/009253
PCT Pub. Date: Feb. 2, 2023

(65) Prior Publication Data

US 2024/0345347 A1 Oct. 17, 2024

Related U.S. Application Data

(60) Provisional application No. 63/227,675, filed on Jul. 30, 2021.

(51) Int. Cl.
*G02B 6/42* (2006.01)
*G01M 11/00* (2006.01)

(52) U.S. Cl.
CPC .......... *G02B 6/4289* (2013.01); *G01M 11/35* (2013.01); *G02B 6/4206* (2013.01); *G02B 6/4286* (2013.01)

(58) Field of Classification Search
CPC .. G02B 6/4289; G02B 6/4206; G02B 6/4286; G02B 6/4256; G02B 6/4257; G01M 11/35; G01M 11/33
See application file for complete search history.

(56) References Cited

U.S. PATENT DOCUMENTS 5,067,786 A * 11/1991 Hawkins .............. G02B 6/4289 356/73.1
5,742,715 A * 4/1998 Boehlke ................... G02B 6/14 356/73.1

(Continued)

FOREIGN PATENT DOCUMENTS

EP 2352005 A1 8/2011
JP S63149610 A * 6/1988 ............... G02B 6/28

(Continued)

OTHER PUBLICATIONS

International Search Report Corresponding with Application No. PCT/US2022/034699 on Sep. 15, 2022 (1 page).

*Primary Examiner* — Georgia Y Epps
*Assistant Examiner* — Erin R Garber
(74) *Attorney, Agent, or Firm* — Dority & Manning, P.A.

(57) ABSTRACT

An optical fiber identifier apparatus and system are provided. The apparatus includes a housing forming a pathway at which an optical fiber is positionable. The housing forms a tip end that forms a bend of the optical fiber at the pathway. At least two lenses are positioned parallel to one another. Each lens defines an optical axis extended through the bend of the optical fiber and perpendicular to a longitudinal axis of the respective lens. A photo detector device is positioned (Continued)

to receive a beam of light from the optical fiber via the one or more lenses.

17 Claims, 16 Drawing Sheets

(56) References Cited

U.S. PATENT DOCUMENTS

| | | | | |
|---|---|---|---|---|
| 2008/0239295 | A1 * | 10/2008 | Xia | G02B 6/4289 356/73.1 |
| 2011/0217004 | A1 * | 9/2011 | Niimi | G02B 6/2852 385/32 |

FOREIGN PATENT DOCUMENTS

| | | | | | |
|---|---|---|---|---|---|
| JP | S62361207 | A | * | 10/1988 | G02B 6/4201 |
| JP | S63261207 | A | | 10/1988 | |
| JP | 2004109401 | A | * | 4/2004 | |
| KR | 20050058794 | A | * | 6/2005 | G02B 6/4204 |

* cited by examiner

WAVELENGTH-DETECTING OPTICAL FIBER IDENTIFIER APPARATUS AND METHOD

PRIORITY STATEMENT

The present application claims the benefit of priority to U.S. Provisional Patent Application Ser. No. 63/227,675, filed on Jul. 30, 2021, and to PCT application PCT/US2022/034699, filed on Jun. 23, 2022, the disclosures of which are incorporated by reference herein in their entireties.

FIELD

The present disclosure relates generally to optical fiber identifier apparatuses and methods for fiber identification.

BACKGROUND

Optical fiber identifiers (OFIs) are used in fiber optic telecommunications, networks, data centers and other fields to identify an active optical fiber or cable during maintenance or installation without disrupting any communications carried by the fiber.

A typical OFI uses fiber bending mechanisms to induce a small portion of the optical signal running through an optical fiber to leak from the fiber, allowing the OFI to detect and analyze the signal characteristics for identifying a particular fiber of interest. In an ideal straight-line fiber-optic communication cable, signal light travels and is confined within the core of the fiber, which is surround by a cladding layer and other protective sheaths (e.g., buffer coating, cable jacket, etc.) However, when a fiber is bent into a curved shape, some signal light traveling in the core may escape the core and leak into the cladding layer and protective sheaths area and reach nearby photo detectors. To bend the fiber, two solid parts with matched curve surfaces are commonly used to clamp and shape the fiber. The radius of the curvature surface determines the leaked light power. The smaller the bending radii are, the greater the amount of light that leaks. Finally, the leaked signals are detected and analyzed for fiber identification.

Generally, the bend radius must be small enough to allow sufficient light to escape the fiber so that it can be measured, but not so tightly as to disrupt communications of equipment that are passing light through the fiber. Bend Insensitive Fiber (BIF) was developed to prevent loss when fiber is routed through a building, and around corners, and can be bent further with relatively little light escaping. However, BIF must be bent further than non-BIF to allow measurable light to escape. As such, different fiber types may require different bend radii to cause the same amount of light to leak from the fiber.

Conventional OFIs generally only detect a signal intensity, direction and tone/modulation frequency of a signal carried by the fiber, but not the wavelength of the signal light. In many fields, there is increasing need to identify signal wavelengths, such as signals running on passive optical networks (PON), including GPON (Gigabit PON), EPON (Ethernet PON), XGS-PON (e.g., 10 Gigabit Symmetric PON), and other PON formats.

Accordingly, improved apparatuses and methods for optical fiber identification are desired in the art. In particular, improved apparatuses and methods for optical fiber identification that provide wavelength detection would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, an optical fiber identifier apparatus is provided. The apparatus includes a housing forming a pathway at which an optical fiber is positionable. The housing forms a tip end that forms a bend of the optical fiber at the pathway. At least two cylindrical or rod lenses are positioned adjacent to one another. Each lens defines an optical axis extended through the bend of the optical fiber and perpendicular to a longitudinal axis of the respective lens. One or more photo detector devices is positioned to receive a beam of light from the optical fiber via the one or more lenses.

In accordance with another embodiment, a system for optical fiber identification is provided. The system includes a housing forming a pathway at which an optical fiber is positionable. The housing forms a tip end that forms a bend of the optical fiber at the pathway. At least two cylindrical or rod lenses are positioned parallel to one another. Each lens defines an optical axis extended through the bend of the optical fiber and perpendicular to a longitudinal axis of the respective lens. One or more photo detector devices is positioned to receive a beam of light from the optical fiber via the one or more lenses. A display is configured to receive a signal corresponding to the beam of light received at the photo detector device. The display is configured to display one or more measurements corresponding to a wavelength of the beam of light received at the photo detector device.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1A:
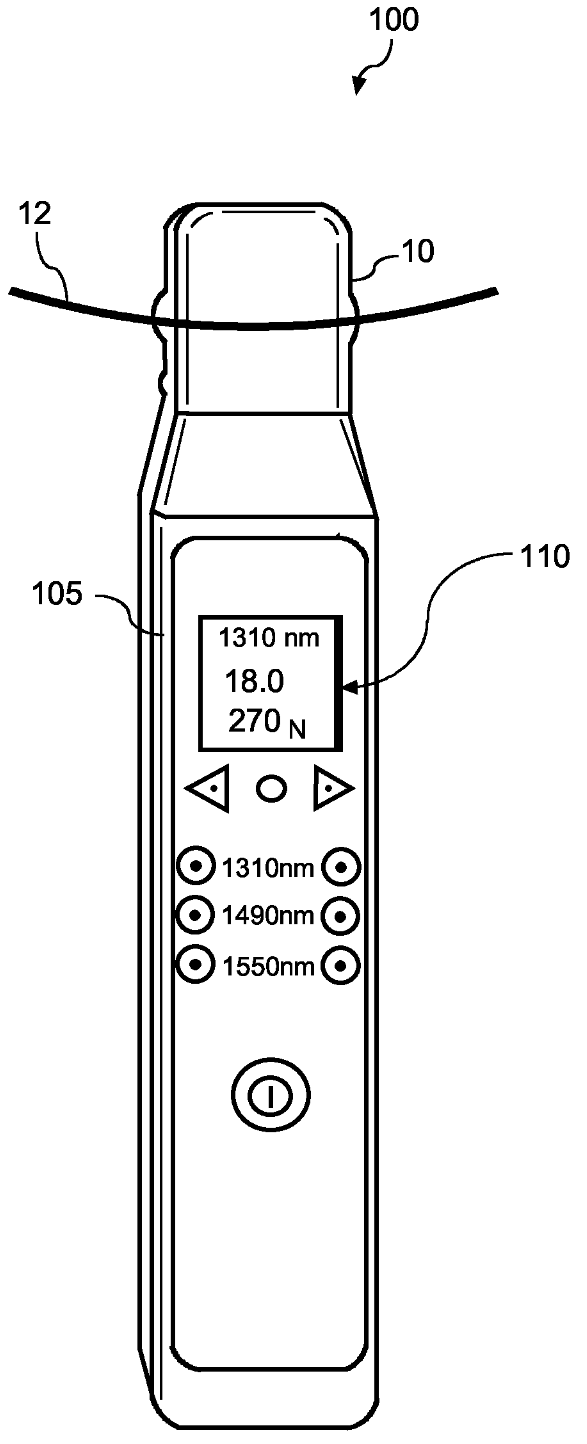
FIG. 1A is a perspective view of an exemplary embodiment of a system for optical fiber identification including an optical fiber identification apparatus in accordance with embodiments of the present disclosure.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Ranges provided herein are inclusive of their end points. For instance, a range of 1 to 100 includes 1 and 100.

Terms of approximation, such as "about," "generally," "approximately," or "substantially," include values within a ten percent full scale error from a lowest value embodiment to a highest value embodiment. For instance, an embodiment including a range from approximately 10 to approximately 100 with a ten percent full scale error may include values from 1 to 109.

Benefits, other advantages, and solutions to problems are described below regarding specific embodiments. However, the benefits, advantages, solutions to problems, and any feature(s) that may cause any benefit, advantage, or solution to occur or become more pronounced are not to be construed as a critical, required, or essential feature of any or all the claims.

Embodiments of systems, apparatuses, and methods for optical fiber identification are provided herein. Particular embodiments provided herein allow for optical fiber identification that provides wavelength detection. Systems, apparatuses, and methods depicted and described herein may allow for performing high-sensitivity, multi-wavelength signal detection and fiber identification.

In various embodiments, an optical fiber identification apparatus is depicted and described herein. The apparatus includes a pair of cylindrical or rod lenses (e.g., glass, plastic, or other appropriate material lens) retained in a housing. A plunger, such as a member, rod, or other structure having a radius at a tip configured to bend a fiber or fiber cable. The tip of the plunger is in a curved shape at which a bend of the fiber is formed. The radius may be determined by the bending tolerance or sensitivity of the fiber. Generally, a bend insensitive fiber (BIF) may require a small radius (e.g., 2.5 mm) relative to a standard fiber (i.e., non-BIF) requiring a larger radius (e.g., 7.5 mm) to limit the introduced bending loss. In one embodiment, the apparatus forms a plurality of curvature surfaces to accommodate the standard fiber, the BIF, and/or other appropriate fibers. The apparatus may include an articulation device configured to translate the plunger, or the tip surface of the plunger, to form desirably change a radius or curvature of the fiber to accommodate the standard fiber, the BIF, or other appropriate fiber. In another embodiment, the plunger, or the tip surface of the plunger, may be configured to have just one curvature to accommodate both the standard fiber and the BIF. In such an embodiment, the plunger may be removed and interchanged in accordance with the type of fiber (e.g., standard or BIF).

In various embodiments of the apparatus, the bent segment of fiber is desirably positioned on or near an optical axis of the lens. In certain embodiments, the bent segment of fiber is desirably positioned around a focal region of the lens. In still particular embodiments, the bent segment of fiber is positioned on or near the optical axis of the lens and around the focal region of the lens. Most leaked lights from the bent fiber can be converged by the lens and formed an expansive beam, such as a collimated beam of light. The leaked light may be converged accordingly due to the short working distance of the lens. Certain embodiments of the apparatus position the pair of lenses from one another at a distance of zero (i.e., abutting one another) up to approximately 50 millimeters (mm). The distance may be based at least in part on the positioning of an optical axis of one or more of a plurality of photo detector devices and/or one or more radii of the tip of the plunger.

The plurality of photo detector devices may be placed in parallel arrangement adjacent to the lens to receive the expansive beams of light (e.g., collimated lights). The plurality of photo detector devices may include a middle detector having the optical axis positioned in substantially co-axial arrangement with the lenses and the tip. In some embodiments, the lens has a diameter of at least approximately 0.25 mm. In still certain embodiments, the diameter of the lens is approximately 5 centimeters (cm) or greater. The range of diameters of the lens may be based at least on a quantity of photo detector devices positioned to receive light from the lens. In some embodiments, the diameter of the lens may be greater than 5 cm. In various embodiments, the photo detector device includes an indium gallium arsenide (InGaAs) photodiode. Other embodiments may include any suitable photo detector device configured for spectral responses between approximately 200 nanometers (nm) to approximately 14 micrometers. In still various embodiments, the apparatus includes any suitable photo detector device configured for near-infrared light detection. In a particular embodiment, the apparatus includes a photo detector device having a 1 mm InGaAs photodiode in a TO-46 package with an approximately 5 mm outer diameter dome lens window. In still other embodiments, the apparatus is configured for ultraviolet light detection to mid-infrared light detection. In another embodiment, the photo detector may have a flat lens window. In still other embodiments, any suitable diameter lens window may be utilized.

Certain embodiments of the apparatus include an optical filter placed in front of the photo detector device to detect a particular desired wavelength component of the leaked signal. Various embodiments of optical filters include thin-film wavelength division multiplexer (WDM) filters appropriate for PON networks. In still various embodiments, the apparatus includes a plurality of photo detector devices in which a first bandpass filter range is at a first photo detector device and a second bandpass filter range is at a second photo detector device. In still other embodiments, the optical filter may be a thin-film coated onto a detector window, allowing for elimination of discrete filters, and/or allowing for smaller packaging, reduced space usage, and decreased complexity.

Figure 1B:
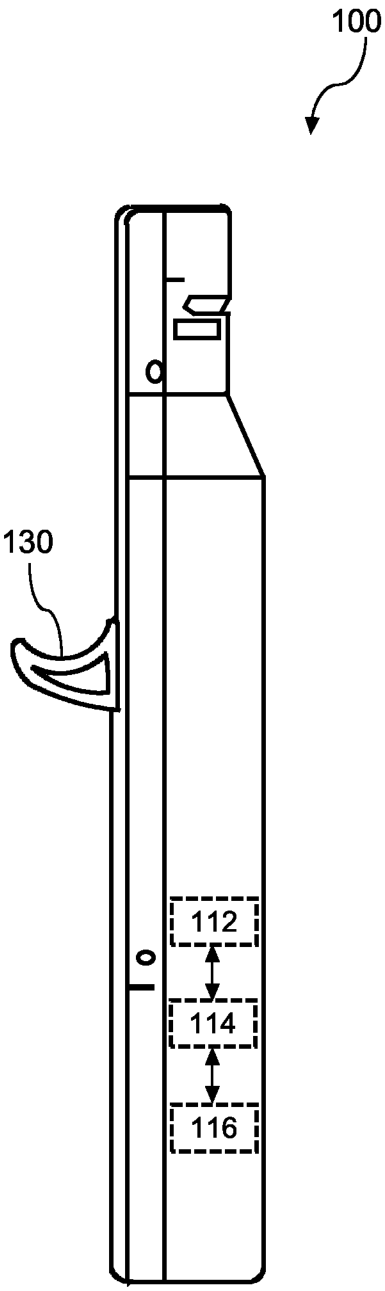
FIG. 1B is a side perspective view of the exemplary embodiment of the system of FIG. 1A in accordance with embodiments of the present disclosure.

Referring now to the drawings, FIG. 1A and FIG. 1B are perspective views of exemplary embodiments of a system for optical fiber identification 100 (hereinafter, "system 100"). The system 100 includes an optical fiber identifier apparatus 10 (hereinafter, "apparatus 10") that may be utilized at any one or more locations along fiber optic telecommunications, distribution networks, data centers, end users, hubs, or other nodes to identify an active optical fiber or cable. The apparatus 10 may be utilized to identify an active optical fiber or cable during maintenance or installation of the fiber optic without disrupting communications carried by the fiber.

The system 100 includes a display 110 positioned or retained by a casing 105. The casing 105 may be formed in a handheld form factor that allows an operator to carry the system 100 to data centers, end users or subscribers, hubs, nodes, or other locations to identify an active optical fiber, perform maintenance and/or installation, and to perform one or more tasks without disrupting communications carried by the fiber. Embodiments of the apparatus 10 may be mounted onto the casing 105 or at least partially formed by the casing 105. As further described herein, a housing 30 (FIGS. 2-4) of the apparatus 10 may be formed, at least in part, by the casing 105. In still further embodiments, a first body 32, a second body 36, or both (FIGS. 2-4, FIGS. 8A-8B, FIGS. 9A-9B) may be formed, at least in part, by the casing 105. At least a portion of the first body 32, such as at least a member 62 such as described further herein, may be moved towards or away from the second body 36 to retain and bend an optical fiber 12. A trigger-type mechanism 130 may be spring-loaded and utilized to drive the first body 32, or particularly the member 62, toward and away from the optical fiber 12, such as further described herein.

Embodiments of the casing 105 including the apparatus 10 may be formed integrally such as provided herein, or as separable components fastened or otherwise secured together. In a particular embodiment, the first body 32 is separably formed and separable from the second body 36, such as to allow the first body 32 to move, replace, or articulate separately from the second body 36.

The casing 105 may house circuitry 112, one or more processors 114, or one or more memory devices 116 within the casing 105. The one or more memory devices 116 may be configured to store instructions that, when executed by the one or more processors 114 or circuitry 112, causes the system 100 to perform operations. As further provided below in regard to embodiments of the apparatus 10 and method 1000 depicted and described below, the system 100 is configured to store and/or execute one or more steps of the method 1000. The operations may include receiving one or more optical signals from an optical fiber identified by the apparatus 10. The signal corresponds to one or more of an intensity, direction, tone or modulation frequency of light from an optical fiber 12. Additionally, the signal corresponds to a wavelength of light from the optical fiber 12. Operations may include obtaining the signal wavelength from the optical fiber 12 at one or more configurations of passive optical networks (PON), including, but not limited to, GPON (Gigabit PON), EPON (Ethernet PON), XGS-PON (e.g., 10 Gigabit Symmetric PON), NG-PON2 (e.g., Next Generation PON2), or other PON formats.

The display 110 is configured to depict or otherwise show to the operator values and/or graphics corresponding to a wavelength, intensity, direction, tone and/or modulation frequency of the beam of light from the optical fiber 12, received at one or more photo detector devices 50 (FIGS. 2-4, FIG. 7) of the apparatus 10, such as provided further herein.

Figure 2:
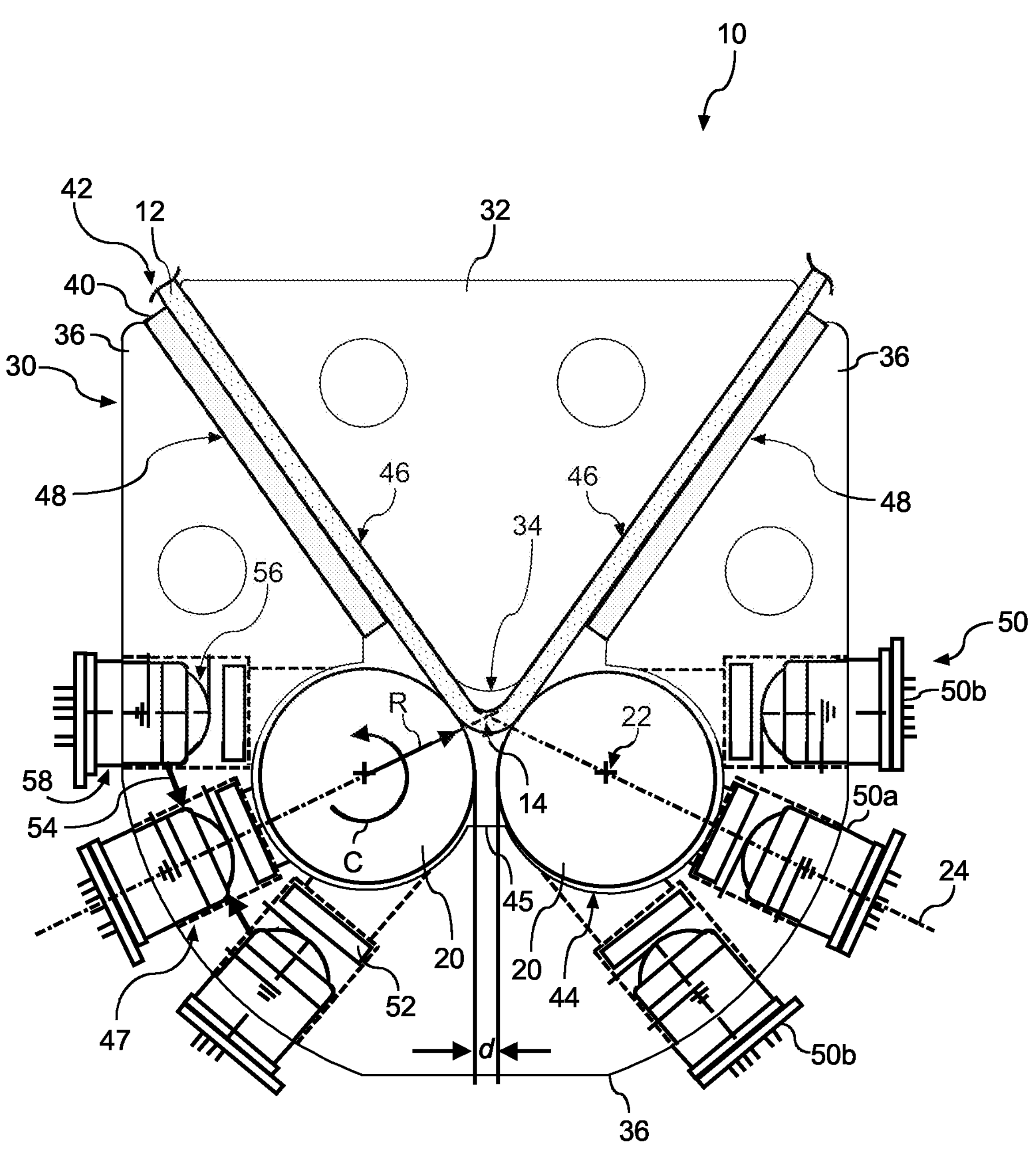
FIG. 2 is a cross-sectional view of an exemplary embodiment of an optical fiber identification apparatus in accordance with embodiments of the present disclosure.

Referring now to FIG. 2, a cross-sectional view of an embodiment of the apparatus 10 is provided. The apparatus 10 includes a housing 30 forming a pathway 42 at which the optical fiber 12 is positionable onto the pathway 42. The optical fiber 12 may be positioned onto the pathway 42 by modulating a relative position of the first body 32 and the second body 36. At an open position, the optical fiber 12 can be placed between first body 32 and the second body 36. At a closed position, the pathway 42 may be formed. The housing 30 forms a tip end 34 having a curved surface that forms a bend 14 of the optical fiber 12 at the pathway 42. It should be appreciated that the optical fiber 12 may include a plurality of optical fibers, such as a cable including a plurality of optical fibers.

Figure 7:
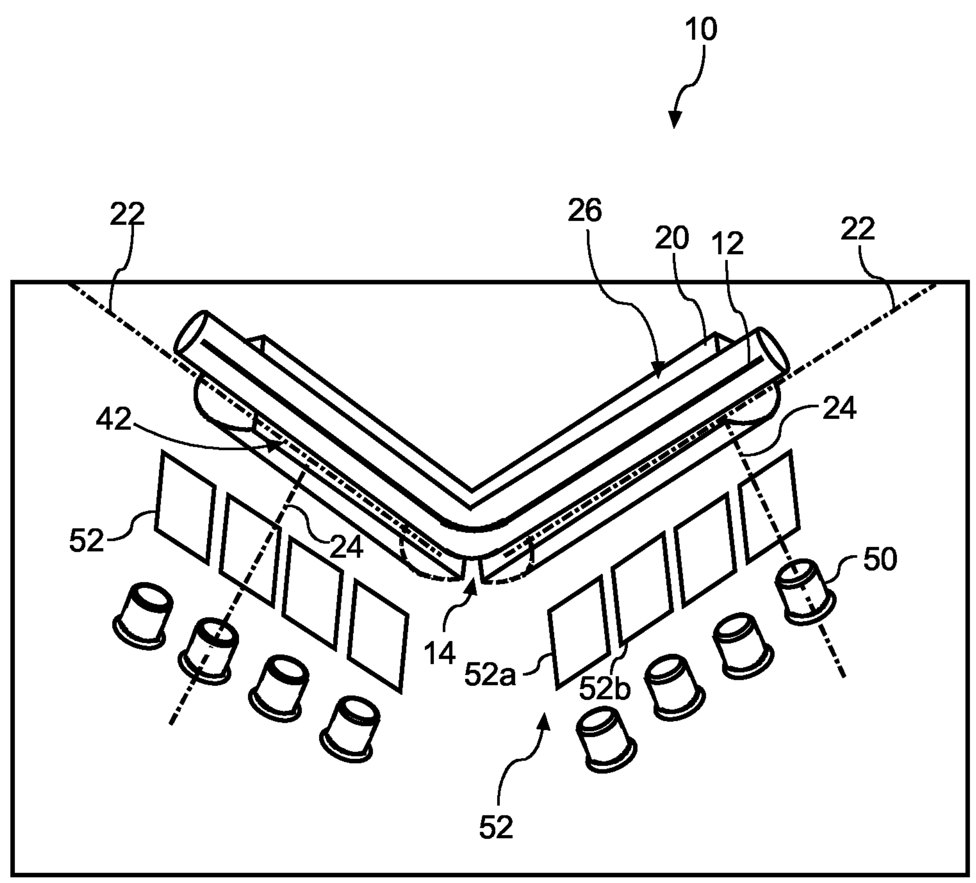
FIG. 7 is a perspective view of a portion of an exemplary embodiment of an optical fiber identification apparatus in accordance with embodiments of the present disclosure.

The apparatus 10 includes at least two cylindrical or rod lenses 20 (hereinafter, "lens 20" or "lenses 20") positioned adjacent to one another. In particular embodiments, the at least two lenses 20 are positioned parallel to one another. Each lens 20 defines an optical axis 24 extended through the bend 14 of the optical fiber 12 and perpendicular to a longitudinal axis 22 of the respective lens 20. In a particular embodiment, the longitudinal axis 22 of each respective lens 20 is positioned parallel to one another. In another particular embodiment, such as depicted in FIG. 7, an end of each lens 20 is positioned parallel to one another, such that an end of one lens 20 is adjacent to the end of another lens 20 along a direction co-directional to the longitudinal axis 22. In various embodiments, one or more photo detector devices 50 is positioned to receive a beam of light from the optical fiber 12 via one or more of the lenses 20. In certain embodiments, an optical filter 52 is positioned between the photo detector device 50 and the lens 20. The optical filter 52 may allow for the apparatus 10 or system 100 to detect certain desired wavelength components of interest from the beam of light from the optical fiber 12.

Figure 3:
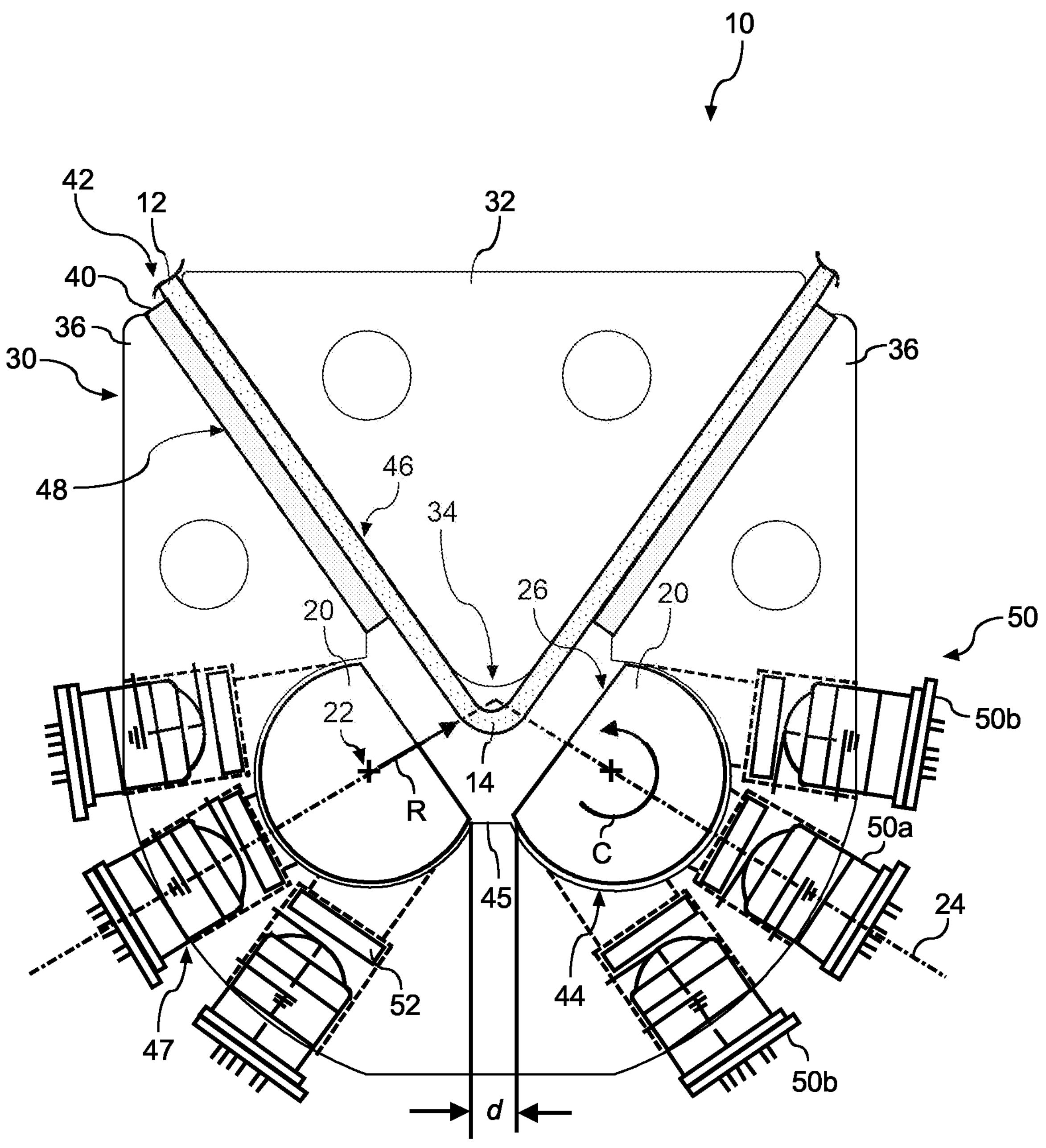
FIG. 3 is a cross-sectional view of an exemplary embodiment of an optical fiber identification apparatus in accordance with embodiments of the present disclosure.
Figure 4:
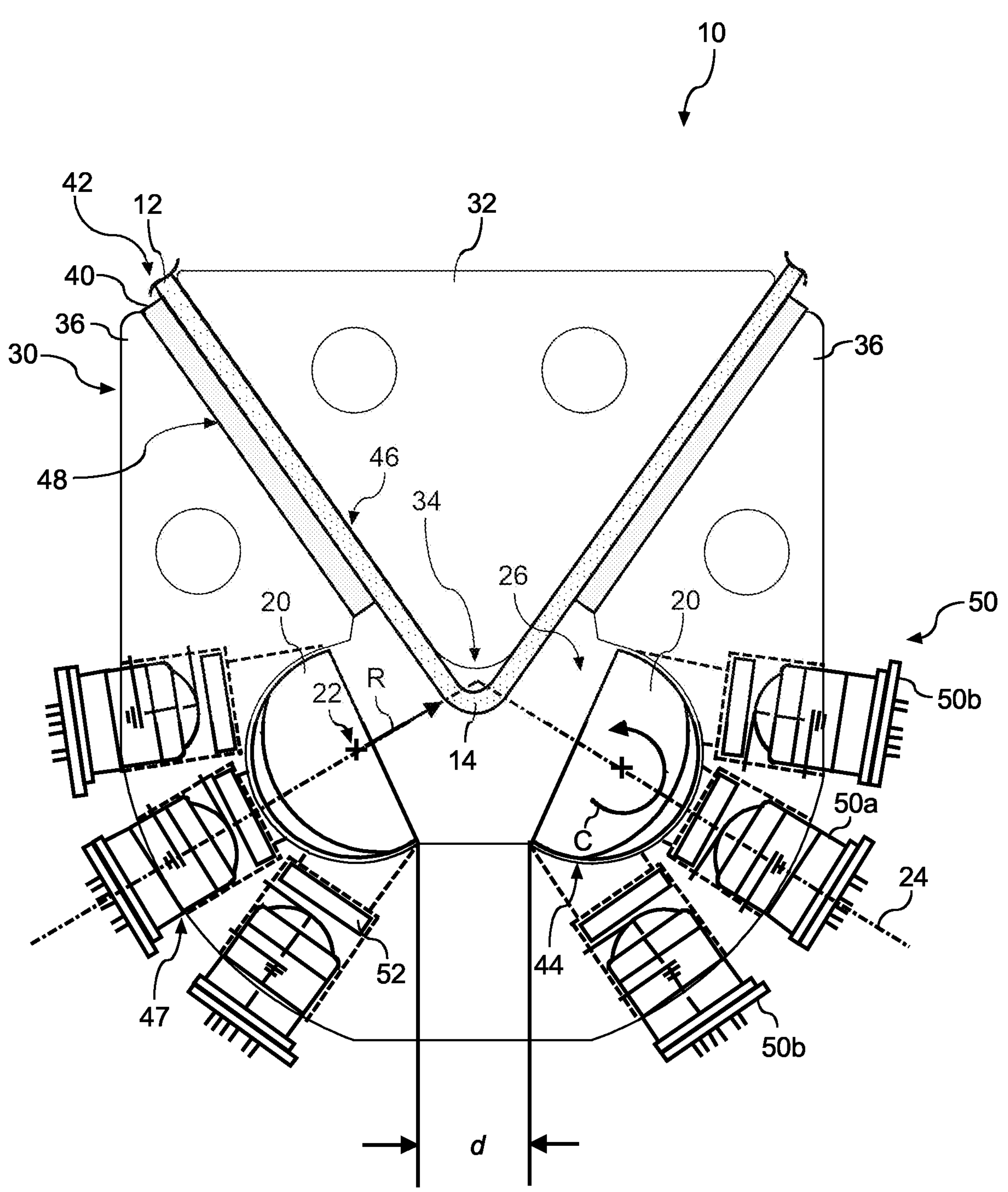
FIG. 4 is a cross-sectional view of an exemplary embodiment of an optical fiber identification apparatus in accordance with embodiments of the present disclosure.
Figure 5:
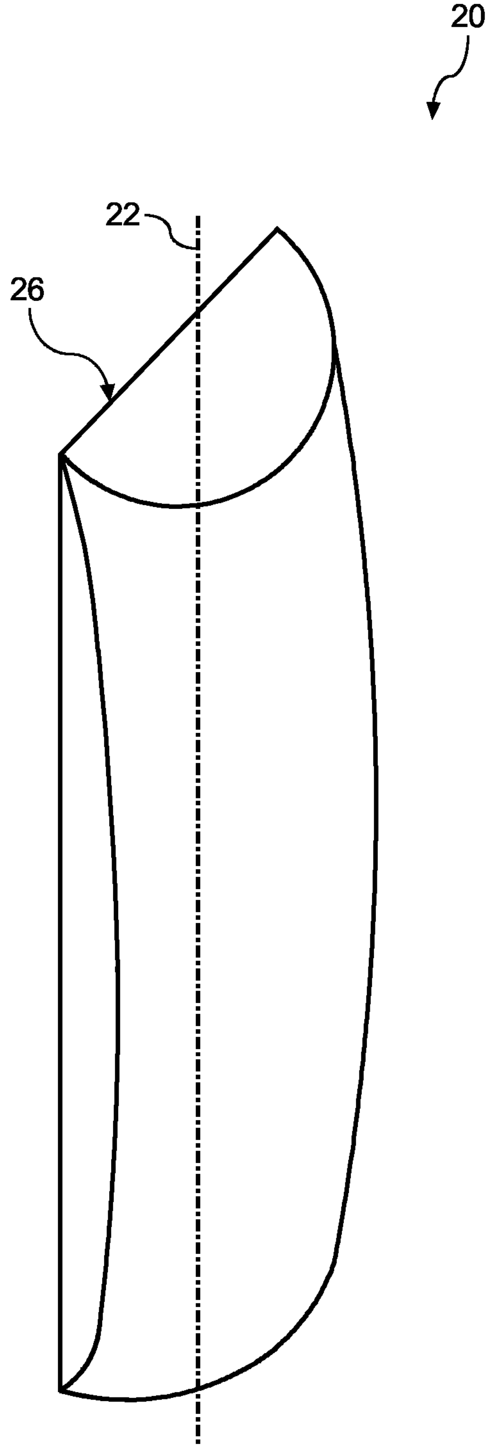
FIG. 5 is a perspective view of an exemplary embodiment of a lens of the optical fiber identification apparatus in accordance with embodiments of the present disclosure.
Figure 6:
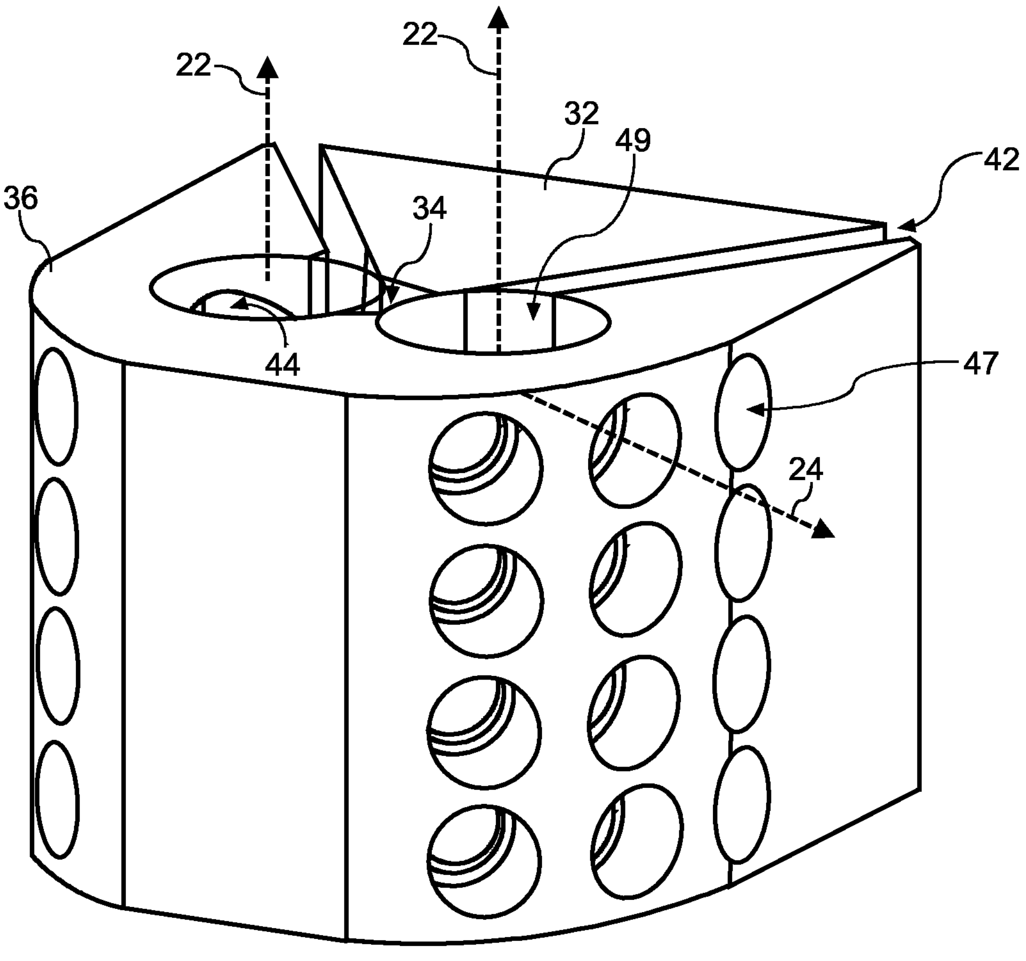
FIG. 6 is a perspective view of a portion of an exemplary embodiment of an optical fiber identification apparatus in accordance with embodiments of the present disclosure.

As used herein, "lens" may refer to any appropriate transmissive optical device allowing for desired focusing or dispersing of light, or combinations thereof. The lens may be formed of any appropriate transparent optical material, including, but not limited to, glass or plastic. The lens depicted and described may generally extend along the longitudinal axis 22 and at least partially form a radius along radial dimension R from the longitudinal axis 22. The lens 20 may generally be configured for one-dimensional or two-dimensional shaping of a light beam. The term "lens", as used herein, may refer to any appropriate type of cylindrical lens, including, but not limited to, a rod lens, a plano-convex cylindrical lens, an a cylindrical lens, a spherocylindrical lens, or other appropriate configuration of cylindrical lens. The embodiment of the apparatus 10 depicted in FIG. 2 illustrates a rod lens 20. FIG. 3 depicts a cross-sectional view of an embodiment of the apparatus 10 configured substantially similarly as depicted and described regarding FIG. 2. However, the embodiment of FIG. 3 forms the lens 20 as a plano-convex cylindrical lens. FIG. 4 depicts a cross-sectional view of an embodiment of the apparatus 10 configured substantially similarly as depicted and described regarding FIG. 2 or FIG. 3. However, the embodiment of FIG. 4 forms the lens 20 as a spherocylindrical lens. FIG. 5 depicts a perspective view of an embodiment of the lens 20 forming a spherocylindrical lens. FIG. 6 depicts a perspective view of an embodiment of the apparatus 10 configured substantially in accordance with the embodiments depicted and described with regard to FIG. 2, FIG. 3, or FIG. 4. The view provided with regard to FIG. 6 omits, for the sake of clarity, certain elements otherwise depicted in FIG. 2, FIG. 3, or FIG. 4.

Referring now to FIG. 2, FIG. 3, and FIG. 4, when the optical fiber 12 is positioned onto the pathway 42 and across the tip end 34, a portion of the optical fiber 12 is bent, such as depicted at bend 14 of the optical fiber 12. The optical axis 24 of the lens 20 extending through the bend 14 may form a primary optical axis for the entire apparatus 10 and system 100 around which the photo detector device(s) 50, the optical filter(s) 52, or both, may be positioned. In a particular embodiment, such as depicted in FIG. 3 or FIG. 4, the optical axis 24 is substantially perpendicular to the plano-surface lens face 26. Certain embodiments of the tip end 34 may include a high optical reflectivity surface treatment, coating, or material to allow more leaked lights from the optical fiber 12 to be captured by the photo detection device(s) 50. In various embodiments, the tip end 34 is a metallic surface. The tip end 34 may be polished or treated in accordance with any appropriate method of increasing optical reflectivity. In a still particular embodiment, the tip end 34 is aluminum, or alloys thereof.

Most leaked light from the bent portion 14 of the optical fiber 12 may be converged by the lens 20 to form an expansive beam of light. In a particular embodiment, the lens 20 forms the beams of light as a collimated or semi-collimated beam of light. Arrangements of the apparatus 10 such as provided herein that allow for the desired convergence of light may allow a plurality of photo detector devices 50 to be arranged along the axial direction, such as co-directional along the longitudinal axis 22 of the lens 20, or in parallel arrangement co-directional to the longitudinal axis 22. The plurality of photo detector devices 50, the plurality of optical filters 52, or both, may be configured to allow for pluralities of wavelength ranges to be detected.

Referring still to FIGS. 2-4, the photo detector device 50 is positioned to receive the beam of light from the bend 14 of the optical fiber 12 via the lens 20. In various embodiments, the photo detector device 50 is positioned substantially co-axial to the optical axis 24 of at least one lens 20. In one embodiment, a first photo detector device 50*a* of the plurality of photo detector devices 50 is positioned substantially co-axial to the optical axis 24 of at least one lens 20. The apparatus 10 may include a second photo detector device 50*b* is positioned paraxial or non-coaxial to the optical axis 24 of the lens 20. In various embodiments, the apparatus 10 includes a plurality of first photo detector devices 50*a*, such as in parallel arrangement, positioned substantially co-axial to the optical axis 24. In other embodiments, the apparatus 10 includes a plurality of the second photo detector device 50*b*, such as in parallel arrangement, positioned non-coaxial to the optical axis 24. In still various embodiments, the apparatus 10 may include a plurality of the first photo detector device 50*a* and the second photo detector device 50*b*.

In various embodiments, the photo detector device 50 is any suitable configuration for ultraviolet light detection, visible light detection, near-infrared light detection, or mid-infrared light detection, or other desired light wavelength. Certain embodiments of the photo detector device 50 are configured for spectral responses between approximately 200 nanometers (nm) and approximately 14 micrometers (μm). A particular embodiment of the photo detector device 50 may be configured for spectral responses between approximately 800 nm and 1700 nm. In a still particular embodiment, the photo detector device 50 is configured to include an indium gallium arsenide (InGaAs) photodiode. However, it should be appreciated that other photodiode configurations may be utilized.

In a particular embodiment, the plurality of photo detector devices 50 includes a first photo detector device configured to detect an intensity of the light from the optical fiber 12 (e.g., configured to exclusively detect an intensity of light)

without an optical filter, such as to improve the detection sensitivity of the system 100. Improved detection sensitivity may be performed via light signal summation/integration. The plurality of photo detector devices 50 may include a second photo detector device including the optical filter 52, such as for detection of the wavelength of the light signal.

An outer diameter 54 of a lens window 56 may be formed at the photo detector device 50. The photo detector device 50 may include a casing 58 configured to protect the lens, photodiodes, or circuitry, such as transistors or other components of the photo detector device 50, from moisture, particulates, heat, contaminants in general, or other environmental factors. In a particular embodiment, the casing 58 of the photo detector device 50 is a hermetically sealed TO-46 package. In other embodiments, the casing 58 may be a TO-38 package, or one or more variants of a TO-18 package generally, or a TO-8 package. In still various embodiments, the packages described herein may be configured in accordance with any appropriate standards organization for electrical or electronic technologies. In a particular embodiment, the photo detector device 50 includes an approximately 5 millimeter (mm) outer diameter 54 of the lens window 56. In another embodiment, the photo detector device 50 may have a flat lens window 56.

In various embodiments, the photo detector device 50 has an outer diameter 54 of the lens window 56 between approximately 2 mm and approximately 50 mm. A particular embodiment of the apparatus 10 may include the photo detector device 50 configured with a 1 mm InGaAs photodiode in casing 58 forming a TO-46 package with an approximately 5 mm outer diameter 54 dome lens window 56. The photo detector device 50 may also be configured as a multi-element detector array housed in one package. However, while particular embodiments are provided herein that may allow for particular benefits and advantages such as described herein, such as, but not limited to, reduced size (e.g., compactness), reduced weight (e.g., portability), and/or one or more wavelength range detection and intensity, direction, tone or frequency of light detection, it should be appreciated that any suitable diameter, casing type, and/or photodiode type may be utilized.

Referring still to FIGS. 2-4, certain embodiments of the apparatus 10 include an optical filter 52 placed in front of the photo detector device 50 (i.e., the optical filter 52 is placed between the photo detector device 50 and the lens 20 relative to the beam of light received by the respective photo detector device 50 from the lens 20). Certain embodiments of the optical filter 52 are configured for one or more particular desired wavelength ranges of the light signal received from the lens 20. Particular embodiments of the optical filter 52 are a thin-film coated onto the detector window may allow for elimination of discrete filters and/or smaller packaging, reduced space usage, and/or decreased complexity. In various embodiments, the optical filter 52 is a wavelength division multiplexer (WDM) filter. In particular embodiments, the optical filter 52 is one or more thin-film WDM filters appropriate for one or more types of PON networks. Still particular embodiments of the optical filter 52 are configured as a bandpass filter within a portion of the range of spectral response for which the photo detector device 50 is configured.

In certain embodiments, the apparatus 10 includes a plurality of optical filters 52 defining various ranges of bandpass filter. The plurality of optical filters 52 may include a first optical filter configured for a first bandpass filter range and a second optical filter configured for a second bandpass filter range different from the first bandpass filter range. In still various embodiments, the apparatus 10 may include a third, fourth, fifth, etc., Nth bandpass filter configured to various ranges. It should be appreciated that the bandpass filter ranges may overlap one another. The quantity of optical filters 52 may correspond to the quantity of photo detector devices 50 at the apparatus 10.

Referring still to FIGS. 2-4, the plurality of photo detector devices 50 may be positioned in adjacent arrangement substantially along a circumferential direction C relative to the longitudinal axis 22 of each respective lens 20. As provided above, the first photo detector device **50*a* may be positioned coaxial to the optical axis 24 and the second photo detector device 50*b* may be coaxial, paraxial, or non-coaxial to the optical axis 24. Accordingly, the plurality of photo detector devices 50 may be in substantially adjacent arrangement along the circumferential direction C, or partially offset from the circumferential direction C, such as due to the non-coaxial arrangement of the second photo detector device 50*b*. The plurality of optical filters 52 is positioned between the respective photo detector device 50 and the lens 20. Various configurations of bandpass filter ranges may be positioned as desired at the first photo detector device 50*a* and the second photo detector device 50*b*. It should be appreciated that one first photo detector device 50*a* may have a first optical filter different from another first photo detector device 50*a* having a second optical filter configured to a second bandpass filter range different from the first optical filter. It should furthermore be appreciated that the first photo detector device 50*a* may have a first optical filter and the second photo detector device 50*b* may have a second optical filter. It should still furthermore be appreciated that one second photo detector device 50*b* may have a first optical filter and another second photo detector device 50*b* may have a second optical filter. In various embodiments, it should be appreciated that one or more of the photo detector devices 50*a*, 50*b* may have a third, fourth, fifth, etc., Nth optical filter 52** such as described above.

In various embodiments of the apparatus 10, the optical filter 52 is configured as an approximately 1260 nm to approximately 1650 nm bandpass filter. Certain embodiments configure the optical filter 52 as any one or more subranges between approximately 1260 nm and approximately 1650 nm. In still various embodiments, the apparatus 10 includes a plurality of optical filters 52 each having one or more bandpass filter ranges such as provided herein. Referring briefly to FIG. 7, in one embodiment, the apparatus 10 includes a first optical filter **52*a* and a second optical filter 52*b*. The first optical filter 52*a* may be configured as a thin-film coating or a bandpass filter different from a thin-film coating or bandpass filter range of the second optical filter 52*b***.

Various embodiments of the optical filter 52 may be configured to target any one or more signal wavelengths such as provided in the table below. The optical filer 52 may accordingly be configured as a bandpass filter of any one or more ranges as provided in the table below. In various embodiments, each optical filter 52 may target a discrete wavelength and may accordingly be configured within a corresponding range. The discrete wavelengths may correspond to one or more passive optical networks, such as, but not limited to, GPON (Gigabit PON), EPON (Ethernet PON), XGS-PON (e.g., 10 Gigabit Symmetric PON), NG-PON2 (e.g., Next Generation PON2), or other PON formats. It should be appreciated that various embodiments of the apparatus 10 provided herein may allow for targeting one or more wavelengths such as provided below. In one embodiment, a first optical filter is configured to target a first wavelength from the table below, and a second optical filter is configured to target a second wavelength from the table below different from the first wavelength. Still various embodiments may include a third, fourth, Nth, etc. optical filter corresponding to different target wavelengths. However, it should be appreciated that the optical filter 52 may be configured to other ranges, such as sub-ranges within the spectral response of the photo detector device 50.

| Wavelength (nm) | Bandpass Filter Range |
|---|---|
| 1270 | 1260-1280 |
| 1310 | 1290-1330 |
| 1490 | 1480-1500 |
| 1532.68 | 1524-1544 |
| 1533.47 | |
| 1534.25 | |
| 1535.04 | |
| 1535.83 | |
| 1536.62 | |
| 1537.41 | |
| 1538.2 | |
| 1550 | 1540-1565 |
| 1577 | 1575-1580 |
| 1596.34 | 1595-1605 |
| 1597.19 | |
| 1598.04 | |
| 1598.89 | |
| 1599.75 | |
| 1600.6 | |
| 1601.46 | |
| 1602.31 | |
| 1610 | 1600-1620 |

Various embodiments of the apparatus 10 include the housing 30 forming a face 46, 48 at which at least a portion of the pathway 42 is formed. The face 46, 48 is extended toward the tip end 34 to position and form the bend 14 of the optical fiber 12 along the optical axes 24 of the lenses 20. The face 46, 48 may extend at an acute or obtuse angle corresponding to the tip end 34 at which the desired bend 14 of the optical fiber 12 is formed.

In certain embodiments, a bumper 40 is positioned at one or more faces 46, 48. The bumper 40 may form of a foam layer at the face. The bumper 40 may additionally be configured as any appropriate light-absorbing material, such to generate a “dark room” at the pathway 42 to allow for improved detection of light signals (e.g., improved detection of weak light signals). Still further, or alternatively, the foam layer or other appropriately soft or compliant material relative to the optical fiber 12 may allow for a clamping force or other retention force on the optical fiber 12 by the housing 30 without damaging the optical fiber 12.

Referring still to FIGS. 2-4, various embodiments of the apparatus 10 may include the housing 30 forming a first body 32 at which the tip end 34 is formed. The first body 32 may be detachable from other portions of the housing 30 and apparatus 10, such as to allow for the optical fiber 12 to be positioned along the pathway 42 and bent to the desired bend 14 by the tip end 34. One or more faces 46 such as described above may be formed at the first body 32. In certain embodiments, the first body 32 includes the face 46 extended at an acute or obtuse angle toward the tip end 34. The first body 32 configured accordingly may position two or more faces 46 in a substantially triangular configuration with the tip end 34 forming a radius corresponding to the desired bend 14 of the optical fiber 12 along the pathway 42. In still particular embodiments, the first body 32 may form a substantially triangular cross-sectional area. However, it should be appreciated that other embodiments may form other cross-sectional shapes at the housing.

The apparatus 10 may further include the housing 30 forming a second body 36 positioned adjacent to the first body 32. One or more faces 48 may be formed at the second body 36, such as described above. The second body 36 may include two or more faces 48 adjacent to the faces 46 formed at the first body 32. The faces 48 formed at the second body 36 may extend at an acute or obtuse angle corresponding to the faces 46 at the first body 32. The first body 32 and the second body 36 may together form at least a portion of the pathway 42 such as described herein.

In various embodiments, the second body 36 is configured to retain one or more of the lenses 20. In certain embodiments, the second body 36 forms a channel 44 at which the lens 20 is positioned. The channel 44 may correspond to the radius dimension R of the lens 20 and extend at least partially along the circumferential direction C relative to the longitudinal axis 22 of the lens 20. In particular embodiments, the lens 20 has a diameter ranging from approximately 0.25 mm to approximately 5 centimeters (cm). Stated alternatively, the radial dimension R of the lens 20 may extend from the longitudinal axis 22 from approximately 1 mm to approximately 25 cm. In still various embodiments, the range of diameters or radii of the lens 20 may be based at least on a quantity and/or size of photo detector devices 50 (e.g., size of casing 58, lens window 56, or outer diameter 54) positioned to receive light from the lens 20.

In certain embodiments, the lenses may abut one another. In various embodiments, the housing 30 may form a spacer 45 extended between the lenses 20. The spacer 45 may extend from the channel 44 formed at the second body 36 for positioning the respective lenses 20. The housing 30 may position the lenses 20 from one another at a distance, depicted schematically as dimension d, of zero (i.e., abutting one another) up to approximately 50 mm. The distance (dimension d) is relative to tangent lines extended from a point at an outer diameter of the lens 20 closest to an adjacent lens. The distance may be based at least in part on the positioning of the optical axis 24 and/or one or more radii of the tip end 34 of the housing 30. In certain embodiments, the spacer 45 may correspond to the distance d, such as to position the lenses 20 in accordance with the range of distance d provided herein. Particular ranges of distance d provided herein may allow for optimally positioning the bend 14 of the optical fiber 12 around the focal region of the lens 20. Ranges of distance d provided herein may allow the leaked light to be desirably converged, such as to allow for desired detection of wavelength, or additionally, signal intensity, direction and/or tone/frequency from the leaked light.

Referring to FIG. 2, the optical fiber 12 may physically contact one or more of the lenses 20. In particular, the bent portion at which the radius 14 of the optical fiber 12 is formed may physically contact one or more lenses 20. In the embodiment depicted in FIG. 3 and FIG. 4, the lens 20 is a plano-convex lens having a lens face 26 configured to receive light from the optical fiber 12. The plano-convex lens 20 may be positioned such that the optical fiber 12 is separate or otherwise not physically contacting the lens 20. Such arrangement may mitigate scratches, contaminants, or other damage to the lens 20. The surface of the lens 20, such as the lens face 26, may be coated with an anti-reflective coating. Various embodiments of the coating may include any appropriate broadband thin-film anti-reflective coating to improve detection sensitivity. In a particular embodiment, the lens 20 is coated with a magnesium fluoride ($MgF_2$)

coating. The thin-film coating may also be deposited as an optical filter corresponding to the ranges, or sub-ranges, of wavelength detection such as described regarding the optical filter 52 and/or the photo detection device 50.

Referring to FIG. 2, FIG. 3, and FIG. 4, in certain embodiments the housing 30, or one or more of the first body 32 or the second body 36, is extended co-directional to the longitudinal axis 22 of the lens 20. In various embodiments, the second body 36 is configured to position and/or retain the one or more photo detector devices 50. The second body 36 may further be configured to position and/or retain the one or more optical filters 52. The housing 30 may form a slot 47 into which the photo detector device 50, or additionally, the optical filters 52, is inserted and positioned relative to the lens 20. In a particular embodiment, the second body 36 of the housing 30 forms a slot 47. The housing 30 may form a plurality of slots 47 each corresponding to a desired location of the plurality of photo detectors 50, such as described regarding the first photo detector 50*a* and the second photo detector 50*b*. The slots 47 may arrange the plurality of photo detector devices 50 substantially along the circumferential direction C relative to the lens 20, such as described above. The slots 47 may additionally position the plurality of photo detector devices 50 in parallel arrangement co-directional to the longitudinal axis 22, such as depicted in FIG. 6.

Referring briefly to FIG. 6, the housing 30 is extended co-directional to the longitudinal axis 22. The second body 36 is configured to position and/or retain the one or more photo detector devices 50, or additionally, the optical filter 52, such as described above. In the embodiment depicted in FIG. 6, the housing 30 forms a longitudinally extended opening 49 at which the lens 20 is positioned. In a particular embodiment, the channel 44 is extended co-directional to the longitudinal axis 22 to form the opening 49. The slot 47 may additionally extend through the second body 36 to the opening 49, such as depicted and described with regard to FIG. 2, FIG. 3, and FIG. 4. into which the photo detector device 50, or additionally, the optical filter 52, is inserted and positioned relative to the lens 20. The slots 47 may arrange the plurality of photo detector devices 50 substantially along the longitudinal axis 22 of the lens 20.

Referring to FIG. 7, a perspective view of a portion of an embodiment of the apparatus 10 is provided. The embodiment depicted in FIG. 7 may be configured substantially similarly as described with regard to FIGS. 2-4. It should be appreciated that the embodiment depicted in FIG. 7 omits the housing 30 and other components for clarity. However, the components depicted and described with regard to FIGS. 2-4 may be included in the illustration provided with regard to FIG. 7. In FIG. 7, the apparatus 10 is additionally, or alternatively, depicted with the plurality of photo detector devices 50 positioned in parallel arrangement co-directional to the longitudinal axis 22 of the lens 20. The slots 47 described with regard to FIGS. 2-4 may be formed through the housing 30 to position at least a portion of the plurality of photo detectors 50 in adjacent arrangement co-directional to the longitudinal axis 22 of the lens 20. The plurality of optical filters 52 may further be positioned co-directional to the longitudinal axis 22 of the lens 20. The lens face 26 forms at least a portion of the pathway 42 along which the optical fiber 12 is positionable. Although not depicted in FIG. 7, it should be appreciated that embodiments of the housing 30, or particularly the first body 32, may be positioned at the optical fiber 12 to form the bent portion or bend 14 such as described with regard to FIGS. 2-4.

Figure 8A:
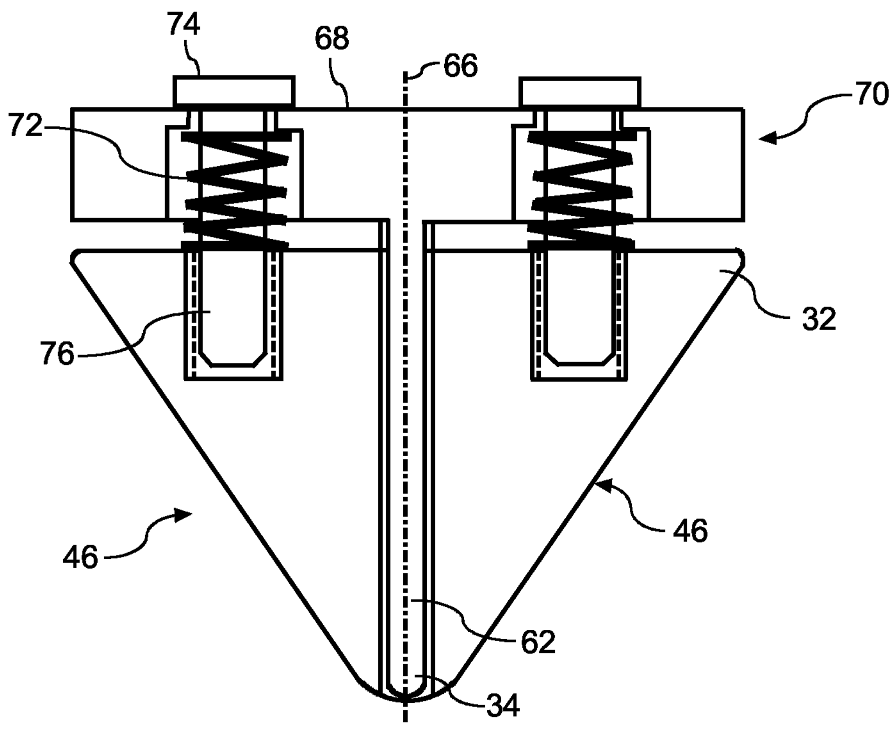
FIG. 8A is a cross-sectional view of an exemplary embodiment of a portion of an exemplary embodiment of an optical fiber identification apparatus in accordance with embodiments of the present disclosure.
Figure 8B:
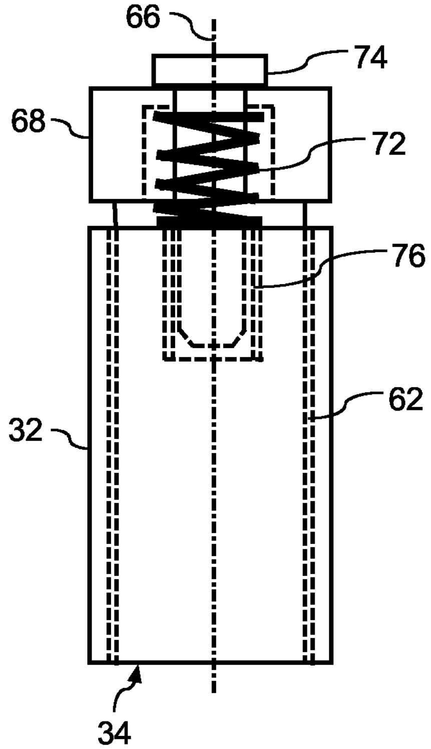
FIG. 8B is a side cross-sectional view of the portion of the exemplary embodiment of the optical fiber identification apparatus of FIG. 8A.
Figure 9A:
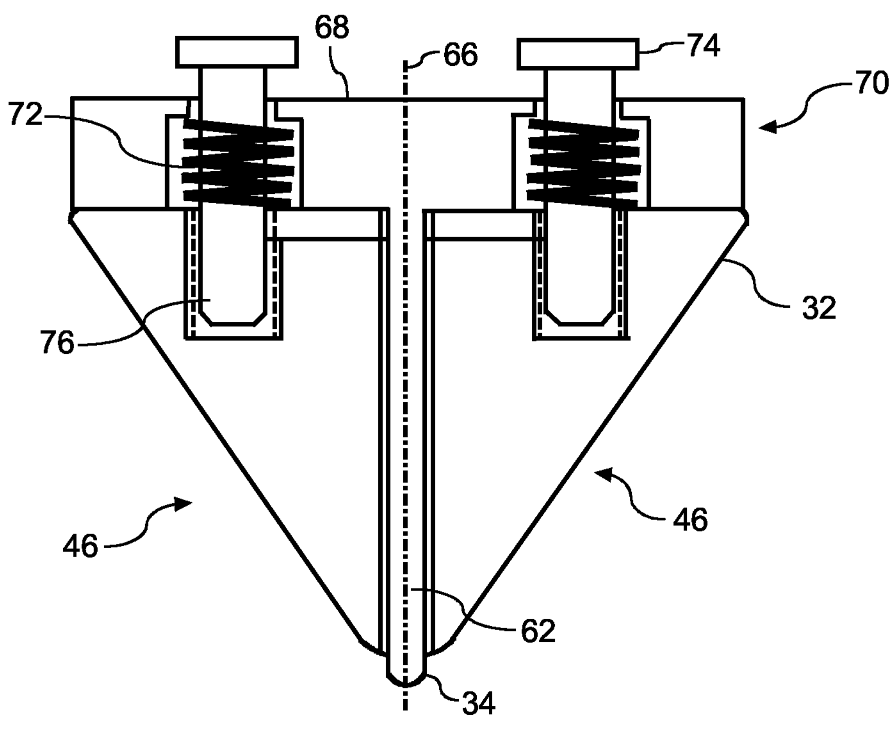
FIG. 9A is a cross-sectional view of an exemplary embodiment of a portion of an exemplary embodiment of an optical fiber identification apparatus in accordance with embodiments of the present disclosure.
Figure 9B:
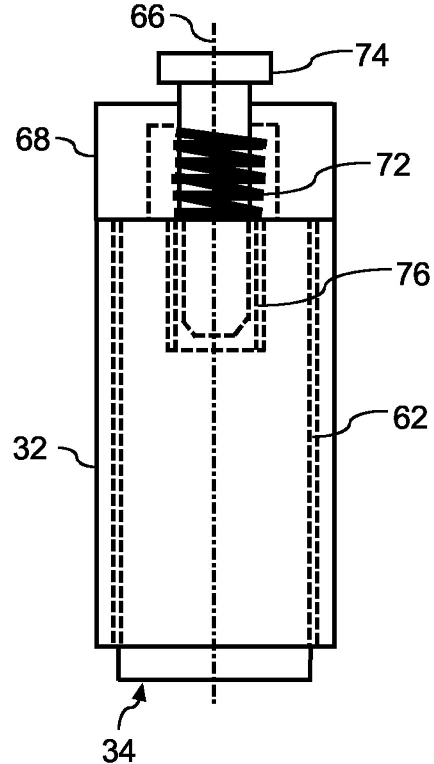
FIG. 9B is a side cross-sectional view of the portion of the exemplary embodiment of the optical fiber identification apparatus of FIG. 9A.

Referring now to FIG. 8A and FIG. 9A, cross-sectional views of embodiments of the first body 32 of the housing 30 are provided. FIG. 8B provides a side cross-sectional view of the embodiment depicted in FIG. 8A. FIG. 9B provides a side cross-sectional view of the embodiment depicted in FIG. 9A. The first body 32 depicted in FIGS. 8A-8B and FIGS. 9A-9B may be configured substantially similarly as depicted and described with regard to FIGS. 2-5. FIGS. 8A-8B and FIGS. 9A-9B depict the first body 32 including a member 62 extended through the first body 32. The tip end 34, such as described with regard to FIGS. 2-4, is formed at the member 62. The member 62 may be attached to an actuation device 70 configured to articulate the tip end 34 along a translation axis 66 to change the radius 14 of the optical fiber 12 (FIGS. 2-4, FIG. 7). The radius may be determined by the bending tolerance or sensitivity of the optical fiber. Generally, a bend insensitive fiber (BIF) may require a small radius (e.g., 2.5 mm) relative to a standard fiber (i.e., non-BIF) requiring a larger radius (e.g., 7.5 mm) to limit the introduced bending loss.

Referring to FIGS. 8A-8B, the member 62 and the tip end 34 are in a first position defining a first radius for the optical fiber when positioned along the pathway 42 (FIGS. 2-4). Referring to FIGS. 9A-9B, the member 62 is translated or extended along the translation axis 66 to a second position defining a second radius for the optical fiber when positioned along the pathway 42 (FIGS. 2-4). The first position may correspond to a desired bend radius for a standard or non-BIF, such as approximately 7.5 mm. The second position may correspond to a desired bend radius for a BIF, such as approximately 2.5 mm. However, it should be appreciated that the apparatus 10 may allow for positioning of the tip end 34 to any plurality of positions between a minimum and maximum position. In various embodiments, the apparatus 10 may be configured to adjust the bend to any value between approximately 1 mm to approximately 20 mm.

In a particular embodiment, the apparatus 10 includes an actuation device 70. The actuation device 70 includes a mount plate 68 from which the member 62 is extended. The member 62 and the mount plate 68 may form an integral structure that is detachable from the first body 32. Certain embodiments may include the member 62 as detachably coupled to the mount plate 68, such as via threads or fasteners. The actuation device 70 may generally include an actuator configured to translate the mount plate 68 including the tip end 34 at the member 62 along the translation axis 66. The actuation device 70 may further be configured to hold or retain one or more positions along the translation axis 66 such as described above.

In a particular embodiment, the actuation device 70 includes a spring 72, or other appropriate device configured to generate a spring force, is positioned to react against the first body 32 and the mount plate 68. A fastener 74 is configured to retain the mount plate 68 to the first body 32. In various embodiments, the fastener 74 is a mechanical fastener, such as, but not limited to, a bolt and nut, a screw, or a tie rod. The fastener 74 and the first body 32 may together include a threaded interface 76 configured to receive threads of the fastener 74. Adjusting a driving depth (i.e., a dimension along the translation axis 66) of the fastener 74 can set a desired separation distance between the mount plate 68 and the first body 32. In a particular embodiment, the mount plate 68 is operably coupled to the trigger-type mechanism 130 (FIG. 1B) of the system 100. Actuation of the mechanism 130, such as via pulling and releasing of the mechanism 130 by an operator, may cause the actuation device 70 to operate such as described herein.

In another embodiment, the system 100 (FIG. 1A and FIG. 1B) may include one or more electro-mechanical actuators and related driver circuits configured to electronically drive the first body 32, or particularly the actuation device 70, or particularly the mount plate 68, to engage and disengage the second body 36 at any plurality of positions such as described herein, such as to allow the tip end 34 to be positioned at any desired plurality of positions.

A method for operating an optical fiber identifier such as described herein includes adjusting the bend radius 14 of the optical fiber 12 (FIGS. 2-4) via adjusting the radius of the tip end 34. Adjusting the tip end 34 may include removing and replacing the first body 32 at which the tip end 34 is formed, or removing and replacing the member 62 with an appropriate tip end 34 based at least on the type of optical fiber 12 being identified (e.g., standard fiber or BIF).

In a particular embodiment, adjusting the bend radius 14 of the optical fiber 12 includes selectively engaging or disengaging the mount plate 68 and the first body 32 guided through the fastener 74. FIGS. 8A-8B depict the spring 72 reacting against the first body 32 to push the mount plate 68 with the member 62 outward (e.g., a first position), such as away from the first body 32. FIGS. 9A-9B depict the mount plate 68 engaged with the first body 32 guided through the fastener 74. The plunging force exerted on the mount plate 68 pushes the mount plate 68 and member 62 inward to extend the tip end 34 downward, such as away from the faces 46 at the first body 32, or into the optical fiber 12 (FIGS. 2-4) to generate a smaller bend radius (e.g., a second position). It should be appreciated that selective engagement and disengagement of the mount plate 68 and the first body 32 such as described above may allow the tip end 34 to be positioned at any plurality of positions forming any desired radius 14 of the optical fiber 12.

Figure 10:
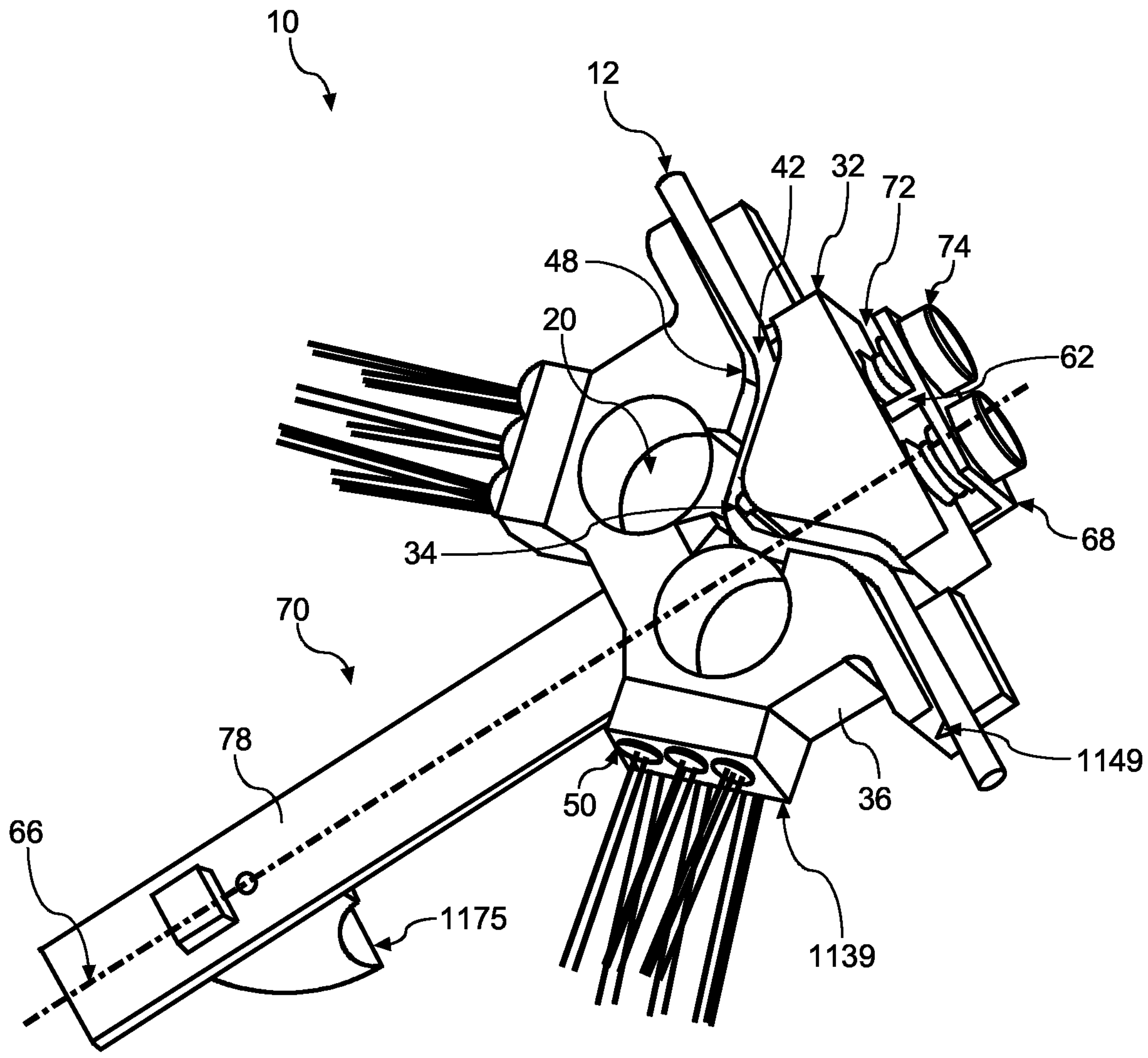
FIG. 10 is a perspective view of an exemplary embodiment of an optical fiber identification apparatus in accordance with embodiments of the present disclosure.

Referring to FIG. 10, a perspective view of another exemplary embodiment of the apparatus 10 is provided. The apparatus 10 may include an assembly including the first body 32, the second body 36, and the actuation device 70. FIG. 10 further depicts a rail 78 extending substantially along translation axis 66 and connected to mount plate 68. In various embodiments, an actuating mechanism 1175 is attached to the rail 78. The actuating mechanism 1175 may form a trigger at which a user may pull to actuate or translate the mount plate 68 such as described herein. The actuating mechanism 1175 may further be configured to hold or retain one or more positions along the translation axis 66. In still various embodiments, the actuating mechanism 1175 may be configured to hold position of the rail 78 and mount plate 68 along the translation axis 66 (e.g., via a lock, pin, fastener, set screw, etc., or other fastening device). Accordingly, member 62 is translated to the second position (e.g., FIGS. 9A-9B) defining the second radius for a BIF fiber when positioned along the pathway 42.

In an embodiment, applying a force to pull the actuating mechanism 1175 translates the mount plate 68 along the translation axis 66 toward the second body 36. In a particular embodiment, the actuating mechanism 1175 translates the mount plate 68 including the tip end 34 at the member 62 along the translation axis 66 and into pathway 42 at which the optical fiber 12 is positioned. In still particular embodiments, a groove 1149 is formed at face 48 (FIG. 4) at which at least a portion of the pathway 42 is formed. In certain embodiments, groove 1149 forms a substantially V-shape groove or pathway. In still certain embodiments, groove 1149 may form a depth between approximately 2 millimeters (mm) to approximately 5 mm. The groove 1149 may be formed along a midline of the surface 48, or particularly of pathway 42, such as to position and secure the fiber 12 along the midline of the lenses 20.

Figure 11:
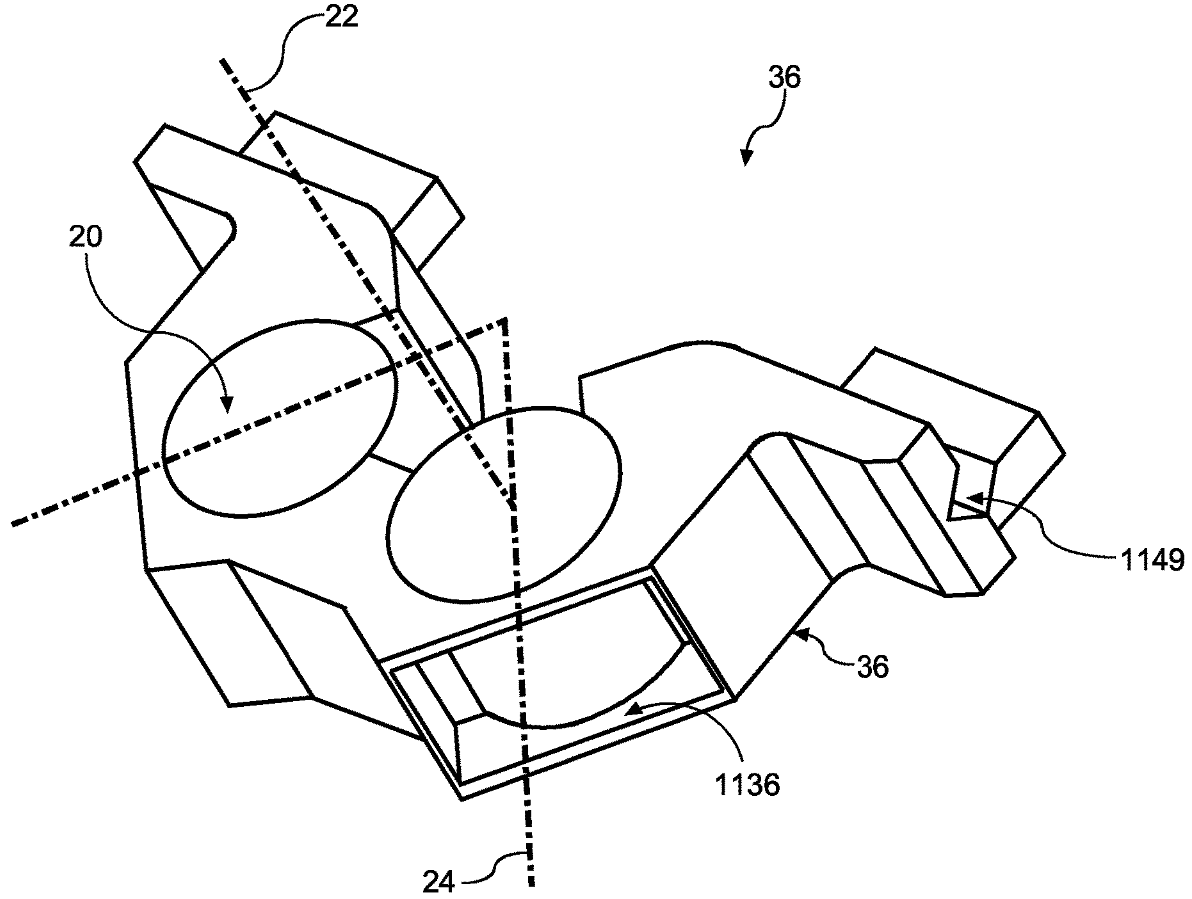
FIG. 11 is a perspective view of an exemplary embodiment of a portion of the optical fiber identification apparatus of FIG. 10 in accordance with embodiments of the present disclosure.
Figure 12:
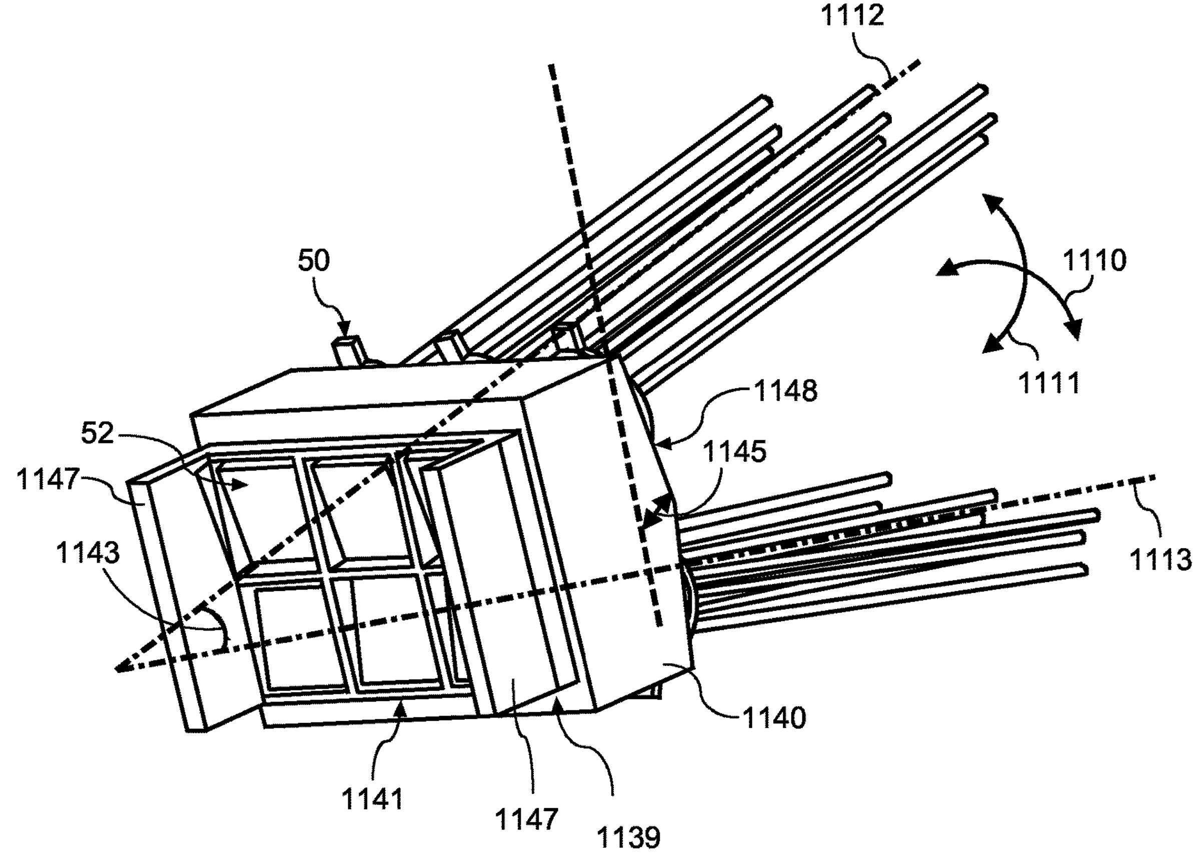
FIG. 12 is a perspective view of an exemplary embodiment of a portion of the optical fiber identification apparatus of FIG. 10 in accordance with embodiments of the present disclosure.
Figure 13:
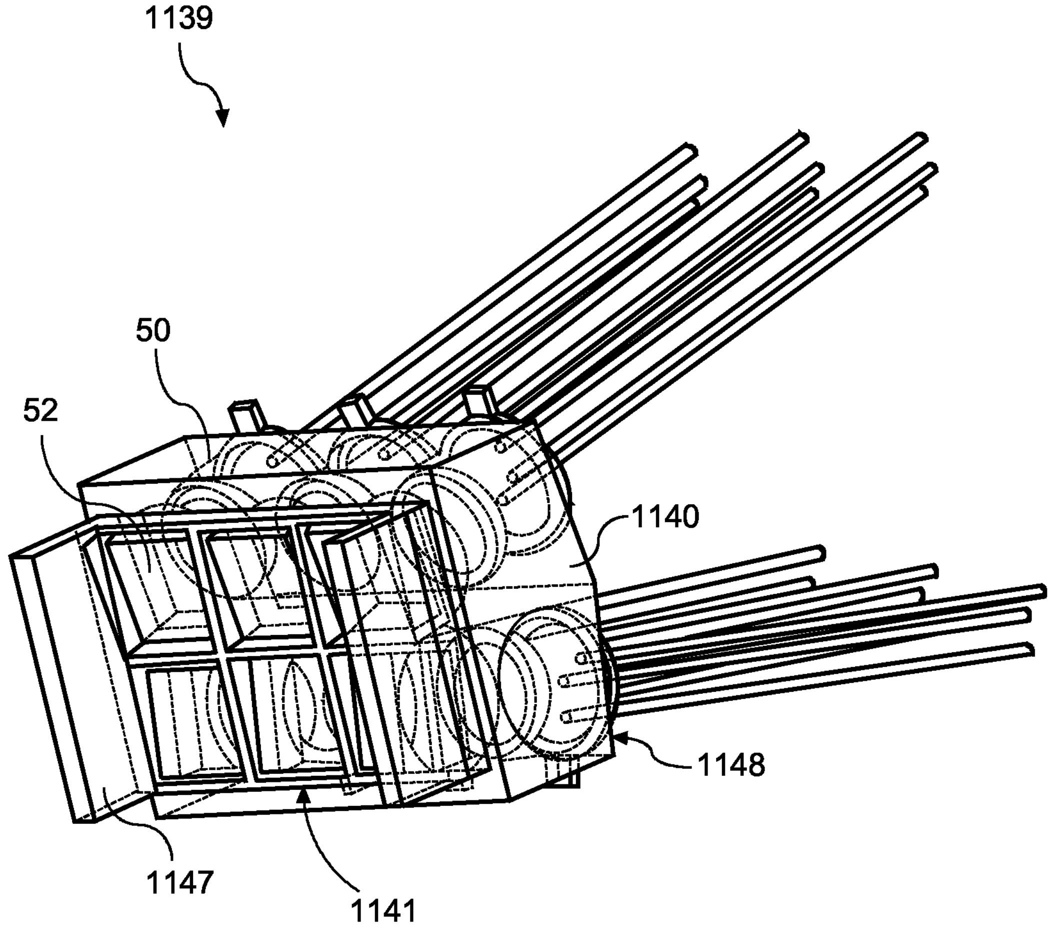
FIG. 13 is a perspective view of an exemplary embodiment of the optical fiber identification apparatus of FIG. 12 in accordance with embodiments of the present disclosure.

FIG. 11 provides a perspective view of an embodiment of the second body 36. FIG. 12 provides a perspective view of an embodiment of a mount structure 1139 for optical filters 52 and photo detector devices 50. FIG. 13 provides a transparent perspective view of the embodiment of the mount structure 1139 of FIG. 12. Referring to FIGS. 10-13, in various embodiments, second body 36 forms opening 1136 to receive and retain the mount structure 1139 at the second body 36. In particular embodiments, opening 1136 is formed extending through the second body 36 substantially along axis 24. In certain embodiments, a pair of openings 1136 is formed symmetrical to optical axis 24 of lens 20 extended through the bend of the optical fiber 12 and perpendicular to a longitudinal axis of the lens 20. The photo detector device 50 and optical filter 52 are mounted and retained at mount structure 1139 configured to position into the opening 1136 to receive the expansive beams of light escaped from the bent fiber 12.

Referring to FIG. 12, the mount structure 1139 is configured to retain one or more of the photo detector devices 50 and optical filters 52. In a particular embodiment, mount structure 1139 includes a body 1140 forming one or more passages 1141 into which the photo detector device 50, optical filter 52, or both may be positioned. Each passage 1141 extends substantially along axis 1112, 1113. In still particular embodiments, the photo detector device 50 and the optical filter 52 may be positioned in serial adjacent arrangement along respective axes 1112, 1113, such as further described herein.

Referring to the exemplary embodiment depicted in FIG. 12, six (6) photo detector devices 50 are positioned at respective passages 1141 extending through body 1140 of mount structure 1139. The plurality of photo detector devices 50 are positioned in separate planes each corresponding to respective axes 1112, 1113. In a particular embodiment, each plane is separated along a pitch direction 1111. At each plane, the embodiment depicted in FIG. 12 includes three (3) passages 1141 at which three (3) photo detector devices 50 are positioned in parallel arrangement along an azimuth direction 1110. As depicted and described in certain embodiments herein, the photo detector device 50 is positioned at mount structure 1139 and the mount structure positions the photo detector device 50 coaxial to optical axis 24.

In certain embodiments, an optical filter 52 may be positioned and retained coaxial with a corresponding photo detector device 50. In particular, optical filter 52 may be positioned between photo detector device 50 and fiber 12. Accordingly, photo detector device 50 and optical filters 52 are positioned respectively along axes 1112, 1113. Axis 1112 is positioned at an angle 1143 relative to one another along the pitch direction 1111. For instance, axis 1112 tilts downward and axis 1113 may tilt upward with approximately identical tilting angle. In various embodiments, mount structure 1139 includes a roof structure 1148 positioning the photo detector device 50, or additionally, the optical filter, along the angle 1143. Passage 1141 may particularly extend perpendicular to a face at the roof structure 1148. Angle 1145 between face of the roof structure 1148 and the direction of lens axis 22 is between 0 degrees and approximately 25 degrees. In another embodiment, angle 1145 is between approximately 3 degrees and approximately 15 degrees. In still particular embodiments, angle 1145 is between approximately 6 degrees and approximately 12 degrees. In a still particular embodiment, angle 1145 is approximately 9 degrees. Such embodiments may position the photo detector device 50 to view or "stare" at the bent fiber 12, such as to maximize the collection of escaped light from the fiber 12.

In a particular embodiment, mount structure 1139 includes mount walls 1147 extending toward opening 1136 at the second body 36. Walls 1147 may be configured to snap, clip, affix (e.g., via adhesive, such as glue, putty, epoxy, or other bonding agent, or a mechanical fastener), or have a tight-fit or interference-fit at opening 1136, such as to retain the mount structure 1139 within opening 1136. It should be appreciated that wall 1147 may include an opening, groove, or a guide or retention structure. A fastener, such as a pin, mechanical fastener, or member may extend through wall 1147 and into second body 36 to retain the mount structure 1139 at the second body 36. Wall 1147 may additionally overlap with surrounding walls of the second body 36, such as to prevent light from leaking between an interface of the mount structure 1139 and the second body 36.

Figure 14:
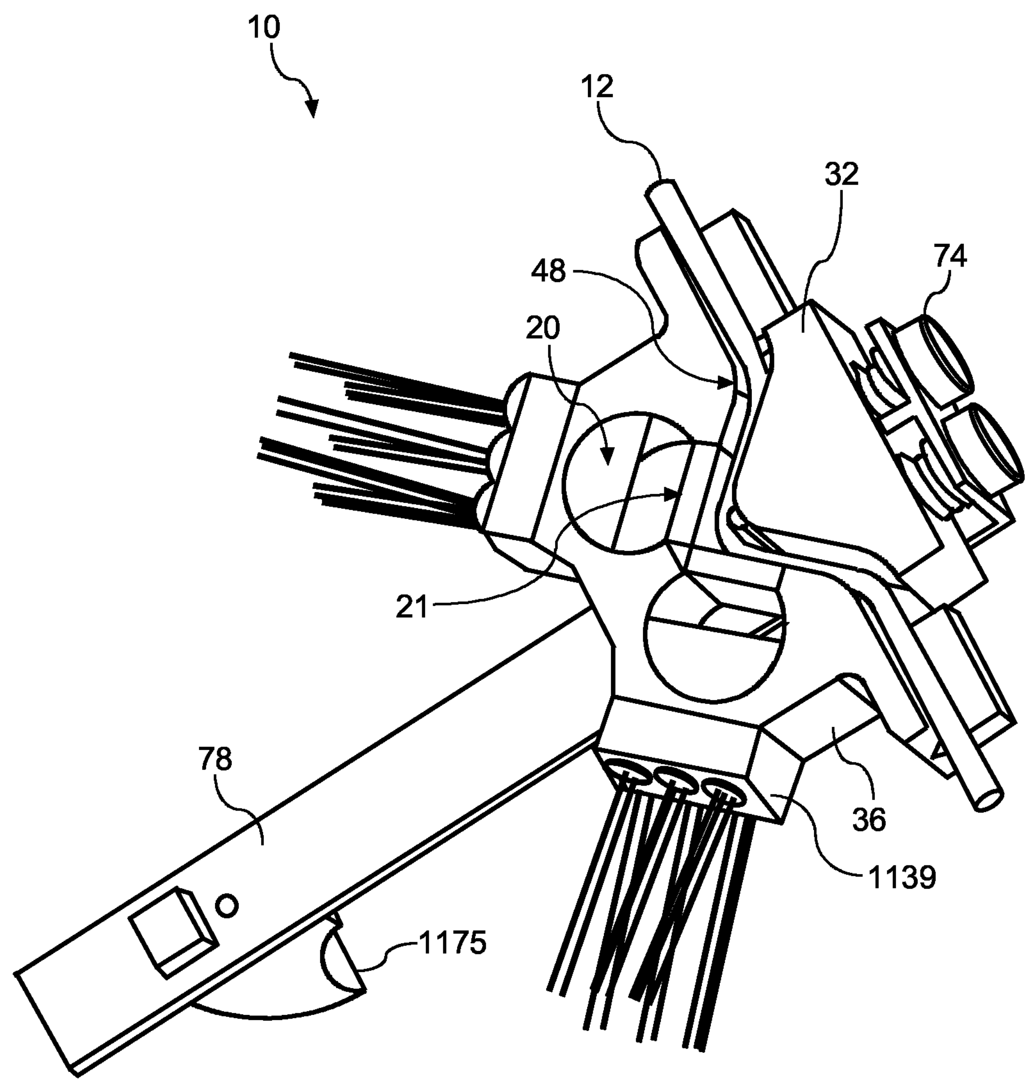
FIG. 14 is a transparent perspective view of the exemplary embodiment of the optical fiber identification apparatus in accordance with embodiments of the present disclosure.

Referring now to FIG. 14, perspective view of another exemplary embodiment of the apparatus 10 is provided. The apparatus 10 may be configured substantially similarly as depicted and described in regard to FIG. 3. In particular, lens 20 is configured as a plano-convex cylindrical lens. A transparent window 21 is positioned between a planar side of the lens 20 and the fiber 12 along the pathway 42. Window 21 may be formed of any appropriate transparent material, such as, but not limited to, glass or plastic. In particular embodiments, window 21 is positioned at the pathway 42 and may form a portion of pathway 42 between fiber 12 and lens 20. In a still particular embodiment, window 21 may form a plate that is flush relative to surface 48, such as to form a portion of pathway 42. In various embodiments, window 21 may include any appropriate geometry, such as a plate configured to function as a slab light pipe by which escaped light from point sources (e.g., a bare fiber 12) may be maximally collected.

Figure 15:
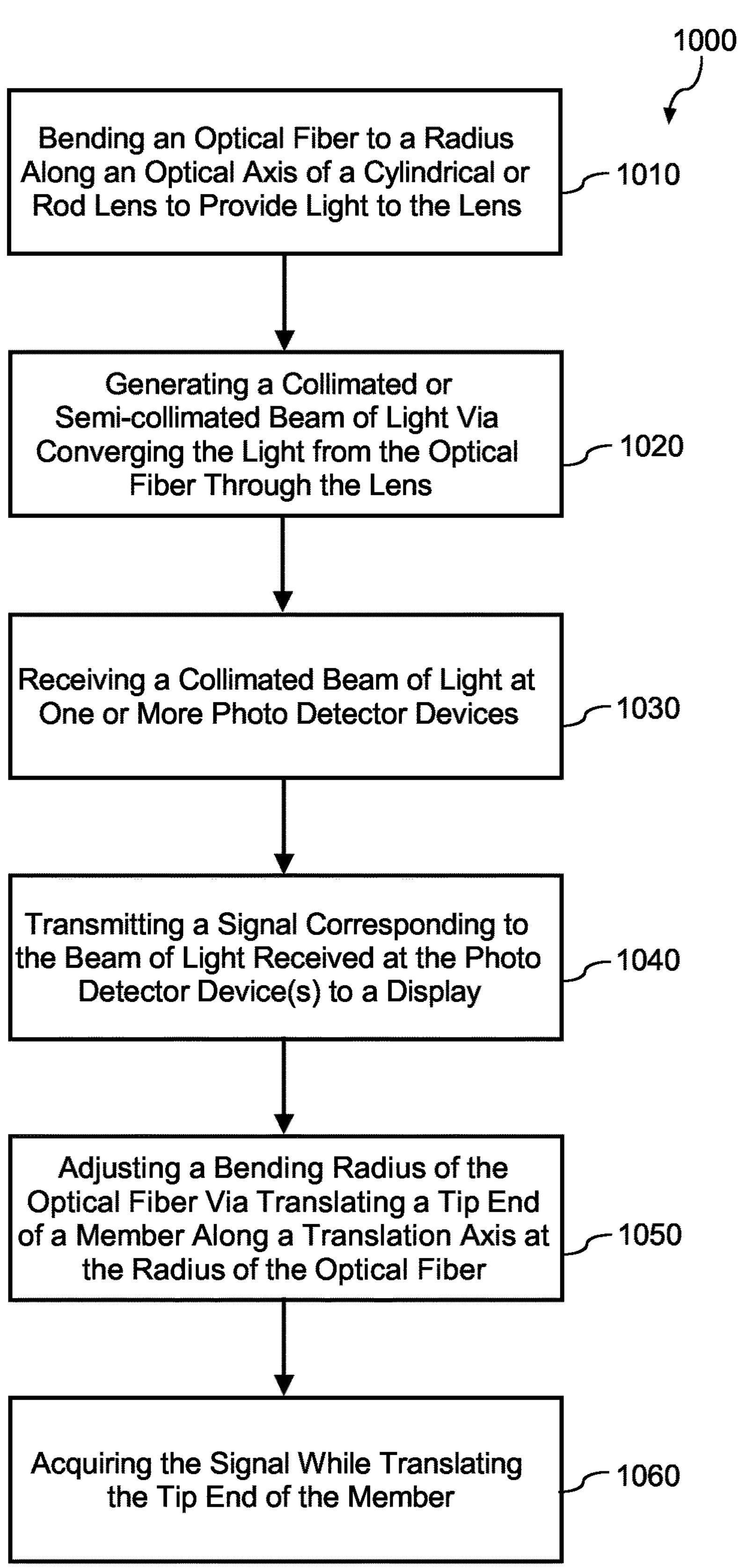
FIG. 15 is a flowchart outlining steps of a method for optical fiber identification in accordance with embodiments of the present disclosure.

Referring back to FIG. 1A and FIG. 1B, embodiments of the system 100 including embodiments of the apparatus 10 provided herein may include one or more processors and one or more memory devices. The one or more memory devices is configured to store instructions that, when executed by the one or more processors, causes the system to perform operations. Referring now to FIG. 15, a flowchart outlining steps of a method for optical fiber identification (hereinafter, "method 1000") is provided. One or more steps of the method 1000 may be stored, performed, and/or executed as operations by embodiments of the system 100 depicted and described with regard to FIG. 1A and FIG. 1B, including embodiments of the apparatus 10 depicted and described with regard to FIGS. 2-14. However, it should be appreciated that the method 1000 may be performed by systems and apparatuses other than those depicted herein.

Referring to FIG. 15, the method 1000 includes at 1010 bending an optical fiber to a desired radius and positioning the bent portion of the optical fiber along an optical axis of a cylindrical or rod lens to provide light to the lens. The method 1000 at 1010 may include placing or positioning the optical fiber (e.g., optical fiber 12) along a pathway (e.g., pathway 42) to bend the optical fiber to form a curved shape (e.g., bend 14).

The method 1000 includes at 1020 generating a collimated or semi-collimated beam of light via converging the light from the optical fiber through the lens (e.g., lens 20). Converging the light from the optical fiber through the lens may include any one or more ranges of distance between the lenses, radii or diameters of lenses, or optical fiber bending radii, or combinations thereof, such as provided herein regarding embodiments of the apparatus 10.

The method 1000 includes at 1030 receiving the collimated beam of light at one or more photo detector devices (e.g., photo detector device 50). Receiving the collimated beam of light may include arranging a plurality of photo detector devices relative to the lens and/or configuring one or more photo detector devices and/or optical filters in accordance with embodiments of the apparatus 10 depicted and described herein.

The method 1000 includes at 1040 transmitting a signal corresponding to the beam of light received at the photo detector device(s) to a display (e.g., display 110 in FIG. 1). The method 1000 at 1040 may particularly include receiving the signal from the photo detector device 50 corresponding to the beam of light received by the photo detector device 50 from the optical fiber 12. The display may include any appropriate monitor or display device. The signal corresponds to one or more of a wavelength, intensity, direction, tone and/or modulation frequency of the beam of light received at the one or more photo detector devices.

In particular embodiments, the method 1000 includes at 1050 adjusting a bending radius of the optical fiber via translating a tip end of a member along a translation axis at the radius of the optical fiber. The method 1000 at 1050 may include selectively actuating the tip end of the member into or away from the optical fiber. In a particular embodiment, the method 1000 at 1050 includes engaging and/or disengaging the mount plate 68 and the first body 32 to which the tip end 34 of the member 62 is operably coupled to translate along the translation axis. In a still particular embodiment, the method 1000 includes at 1060 acquiring the signal while translating the tip end of the member.

Referring back to FIG. 1A and FIG. 1B, the one or more processors and one or more associated memory devices of the system 100 may be configured to perform a variety of computer-implemented functions, such as steps of the method 1000 described herein. As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory can generally include any appropriate primary storage device or secondary storage device, including, but not limited to, volatile storage memory (e.g., random access memory), non-volatile storage memory (e.g., flash memory, read-only memory, ferroelectric random-access memory, magnetic storage devices, optical discs, etc.), and/or other suitable memory elements, or combinations thereof.

The system 100 may include control logic stored in the memory. The control logic may include computer-readable instructions that, when executed by the one or more processors, cause the one or more processors to perform operations, such as outlined in one or more steps of the method 1000 provided herein. The instructions can be software written in any suitable programming language or can be implemented in hardware, including software permanently written into the memory. Additionally, and/or alternatively, the instructions can be executed in logically and/or virtually separate threads on the processor(s).

The system 100 may also include a communications interface module. In various embodiments, the communications interface module can include associated electronic circuitry that is used to send and receive data. As such, the communications interface module can be used to receive data from the photo detector device(s), and may execute one or more steps of the method 1000 provided herein. The system 100 can also include a network interface used to communicate, for example, with the other computing systems, such as to transmit and/or receive information via a radio signal. It should be appreciated that the communications interface module can be any combination of suitable wired and/or wireless communications interfaces and, thus, can be communicatively coupled to one or more components of the system 100 and/or apparatus 10 via a wired and/or wireless connection.

Embodiments of the apparatus 10 and system 100 provided herein allow for greater amounts or magnitudes of leaked light from the optical fiber to converge and project into the photo detector devices. Embodiments provided herein may accordingly allow for an increased detection sensitivity from a single configuration of photo detector device. Additionally, or alternatively, embodiments provided herein may provide increased detection sensitivity via arrangements of pluralities of photo detection devices provided herein.

Embodiments of the system 100, the apparatus 10, and the method 1000 for optical fiber identification provided herein may allow for optical fiber identification that provides wavelength detection, or additionally, intensity, tone, modulation frequency, and/or direction of the light received from the optical fiber(s). Systems, apparatuses, and methods depicted and described herein may allow for performing high-sensitivity, multi-wavelength signal detection and fiber identification. Embodiments of the system 100, apparatus 10, and method 1000 provided herein may be utilized at any one or more locations along fiber optic telecommunications, distribution networks, data centers, end users, hubs, or other nodes to identify an active optical fiber or cable, such as during maintenance or installation of the fiber optic without disrupting communications carried by the fiber. Embodiments provided herein may minimize handling or wear that may be induced on an optical fiber or cable when performing maintenance, installation, routing, or other tasks.

Further aspects of the invention are provided by one or more of the following embodiments:

1. An optical fiber identifier apparatus including a housing forming a pathway at which an optical fiber is positionable. The housing forms a tip end. The tip end of the housing forms a bend of the optical fiber at the pathway. At least two cylindrical lenses are positioned parallel to one another. Each lens defines an optical axis extended through the bend of the optical fiber and perpendicular to a longitudinal axis of the respective lens. A photo detector device is positioned to receive a beam of light from the optical fiber via the one or more lenses.

2. The apparatus of any one or more embodiments herein, wherein the photo detector device is positioned to receive the beam of light from the bend of the optical fiber via the lens 3. The apparatus of any one or more embodiments herein, wherein the photo detector device is positioned substantially co-axial to the optical axis of the at least one lens.

4. The apparatus of any one or more embodiments herein, wherein the photo detector device includes a first photo detector positioned co-axial to the optical axis of at least one lens; and a second photo detector positioned co-axial or non-coaxial to the optical axis of the lens.

5. The apparatus of any one or more embodiments herein, wherein the housing includes a face forming at least a portion of the pathway along which the optical fiber is positionable.

6. The apparatus of any one or more embodiments herein, wherein the face is extended toward the tip end of the housing to position the radius of the optical fiber along the optical axes of the lenses.

7. The apparatus of any one or more embodiments herein, the apparatus including a bumper positioned at the face, wherein the optical fiber is positionable at the pathway on the bumper.

8. The apparatus of any one or more embodiments herein, wherein the at least two lenses are plano-convex cylindrical lenses each forming a lens face configured to receive light from the optical fiber.

9. The apparatus of any one or more embodiments herein, wherein the lens face forms at least a portion of the pathway along which the optical fiber is positionable.

10. The apparatus of any one or more embodiments herein, wherein a plurality of photo detector devices is positioned in adjacent arrangement along the longitudinal axis of the lens.

11. The apparatus of any one or more embodiments herein, the apparatus including an optical filter positioned between the photo detector device and the lens.

12. The apparatus of any one or more embodiments herein, wherein the optical filter is a wavelength division multiplexer filter.

13. The apparatus of any one or more embodiments herein, wherein the optical filter is a 1260 nanometer to 1650 nanometer bandpass filter.

14. The apparatus of any one or more embodiments herein, wherein the photo detector device is a near-infrared light detection photo detector device.

15. The apparatus of any one or more embodiments herein, wherein the photo detector device is configured for spectral responses between approximately 200 nanometers and approximately 14000 nanometers.

16. The apparatus of any one or more embodiments herein, wherein the photo detector device includes an indium gallium arsenide photodiode.

17. The apparatus of any one or more embodiments herein, wherein the two or more lenses abut one another.

18. The apparatus of any one or more embodiments herein, wherein an outer diameter of the two or more lenses is between 0 millimeters and approximately 50 millimeters apart from one another.

19. The apparatus of any one or more embodiments herein, the housing including a second body configured to retain one or more of the lenses.

20. The apparatus of any one or more embodiments herein, wherein the second body forms a channel at which the lens is positioned.

21. The apparatus of any one or more embodiments herein, wherein the second body is configured to retain the photo detector device.

22. The apparatus of any one or more embodiments herein, wherein the housing includes a first body at which the tip end is formed; and a second body positioned adjacent to the first body, wherein the first body and the second body together form at least a portion of the pathway.

23. The apparatus of any one or more embodiments herein, wherein the first body includes a face extended at an acute or obtuse angle toward the tip end.

24. The apparatus of any one or more embodiments herein, wherein the second body includes a face extended at an acute or obtuse angle toward the tip end.

25. The apparatus of any one or more embodiments herein, the housing including a first body through which a member is extended, wherein the tip end is formed at the member.

26. The apparatus of any one or more embodiments herein, wherein the member is attached to an actuation device configured to articulate the tip end along a translation axis to change the radius of the optical fiber.

27. The apparatus of any one or more embodiments herein, wherein the actuation device includes a mount plate from which the member is extended; a spring positioned to react against the first body and the mount plate; and a fastener configured to retain the mount plate to the first body.

28. The apparatus of any one or more embodiments herein, wherein the first body includes a threaded interface configured to receive threads of the fastener.

29. The apparatus of any one or more embodiments herein, wherein selective engagement of the mount plate and the first body articulates the tip end along the translation axis.

30. A system for optical fiber identification, the system including a housing forming a pathway at which an optical fiber is positionable, wherein the housing forms a tip end, wherein the tip end forms a bend of the optical fiber at the pathway; at least two cylindrical lenses positioned parallel to one another, wherein each lens defines an optical axis extended through the bend of the optical fiber and perpendicular to a longitudinal axis of the respective lens; a photo detector device positioned to receive a beam of light from the optical fiber via the one or more lenses; and a display configured to receive a signal corresponding to the beam of light received at the photo detector device, and wherein the display is configured to display a measurement corresponding to a wavelength of the beam of light received at the photo detector device.

31. The system of any one or more embodiments herein, the display including one or more processors and one or more memory devices, wherein the one or more memory devices is configured to store instructions that, when executed by the one or more processors, causes the system to perform operations, the operations including bending an optical fiber to a radius along an optical axis of a lens to provide light to the lens.

32. The system of any one or more embodiments herein, the operations including generating a collimated or semi-collimated beam of light via converging the light from the optical fiber through the lens.

33. The system of any one or more embodiments herein, the operations including receiving the collimated or semi-collimated beam of light at one or more photo detector devices.

34. The system of any one or more embodiments herein, the operations transmitting a signal corresponding to the beam of light received at the photo detector device(s) to a display.

35. The system of any one or more embodiments herein, wherein the signal corresponds to one or more of a wavelength, intensity, direction, tone and/or modulation frequency of the beam of light received at the one or more photo detector devices.

36. The system of any one or more embodiments herein, the operations adjusting a bending radius of the optical fiber via translating a tip end of a member along a translation axis at the radius of the optical fiber.

37. The system of any one or more embodiments herein, the operations including acquiring the signal while translating the tip end of the member.

38. The system of any one or more embodiments herein including the apparatus of any one or more embodiments herein.

39. A computer-implemented method for optical fiber identification, the method comprising any one or more operations of any one or more embodiments of the system herein.

40. A system for optical fiber identification, the system comprising the apparatus of any one or more embodiments herein, wherein the system is configured to execute the steps of any one or more embodiments of the method for optical fiber identification.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical fiber identifier apparatus, the apparatus comprising:

a housing forming a pathway at which an optical fiber is positionable, wherein the housing forms a tip end, wherein the tip end of the housing forms a bend of the optical fiber at the pathway;

at least two cylindrical lenses positioned adjacent to one another, wherein each lens defines an optical axis extended through the bend of the optical fiber and perpendicular to a longitudinal axis of the respective lens, and wherein the at least two lenses are rod lenses each forming a lens face configured to receive light from the optical fiber, wherein the lens face forms at least a portion of the pathway along which the optical fiber is positionable; and a plurality of photo detector devices positioned in adjacent arrangement along the longitudinal axis of the rod lenses to receive a beam of light from the optical fiber via the one or more lenses.

2. The apparatus of claim 1, wherein the plurality of photo detector devices are positioned to receive the beam of light from the bend of the optical fiber via the lens.

3. The apparatus of claim 1, wherein the plurality of photo detector devices are positioned substantially co-axial to the optical axis of at least one lens.

4. The apparatus of claim 1, wherein the plurality of photo detector devices comprise:

a first photo detector positioned co-axial to the optical axis of at least one lens; and a second photo detector positioned non-coaxial to the optical axis of the lens.

5. The apparatus of claim 1, wherein the housing comprises a face forming at least a portion of the pathway along which the optical fiber is positionable, wherein the face is extended toward the tip end of the housing to position the bend of the optical fiber along the optical axes of the lenses.

6. The apparatus of claim 5, the apparatus comprising:

a bumper positioned at the face, wherein the optical fiber is positionable at the pathway on the bumper.

7. The apparatus of claim 1, the apparatus comprising:

an optical filter positioned between the photo detector device and the lens.

8. The apparatus of claim 1, wherein the housing comprises:

a first body at which the tip end is formed; and a second body positioned adjacent to the first body, wherein the first body and the second body together form at least a portion of the pathway, and wherein one or both of the first body or the second body comprises a face extended at an acute or obtuse angle toward the tip end.

9. The apparatus of claim 1, the housing comprising:

a first body through which a member is extended, wherein the tip end is formed at the member.

10. The apparatus of claim 9, wherein the member is attached to an actuation device configured to articulate the tip end along a translation axis to change the radius of the optical fiber.

11. The apparatus of claim 10, wherein the actuation device comprises:

a mount plate from which the member is extended;

a spring positioned to react against the first body and the mount plate; and a fastener configured to retain the mount plate to the first body.

12. The apparatus of claim 11, wherein the first body comprises a threaded interface configured to receive threads of the fastener.

13. A system for optical fiber identification, the system comprising:

a housing forming a pathway at which an optical fiber is positionable, wherein the housing forms a tip end, wherein the tip end forms a bend of the optical fiber at the pathway;

at least two cylindrical lenses positioned parallel to one another, wherein each lens defines an optical axis extended through the bend of the optical fiber and perpendicular to a longitudinal axis of the respective lens, and wherein the at least two lenses are rod lenses each forming a lens face configured to receive light from the optical fiber, wherein the lens face forms at least a portion of the pathway along which the optical fiber is positionable;

a plurality of photo detector devices positioned in adjacent arrangement along the longitudinal axis of the rod lenses to receive a beam of light from the optical fiber via the one or more lenses; and a display configured to receive a signal corresponding to the beam of light received at the photo detector device, and wherein the display is configured to display a measurement corresponding to a wavelength of the beam of light received at the photo detector device, wherein the display comprises one or more processors and one or more memory devices, wherein the one or more memory devices is configured to store instructions that, when executed by the one or more processors, causes the system to perform operations, the operations comprising:

bending the optical fiber to a radius along the optical axis of the lens to provide light to the lens.

14. The system of claim 13, the operations comprising:

generating a collimated or semi-collimated beam of light via converging the light from the optical fiber through the lens; and receiving the collimated or semi-collimated beam of light at one or more photo detector devices.

15. The system of claim 14, the operations comprising:

transmitting a signal corresponding to the beam of light received at the plurality of photo detector devices to the display.

16. The system of claim 15, wherein the signal corresponds to one or more of a wavelength, intensity, direction, tone and/or frequency of the beam of light received at the one or more photo detector devices.

17. The system of claim 15, the operations comprising:

acquiring the signal while translating the tip end of a member along a translation axis at the bend of the optical fiber.

* * * * *